US006975911B2

(12) United States Patent
Stamps et al.

(10) Patent No.: US 6,975,911 B2
(45) Date of Patent: *Dec. 13, 2005

(54) OPERATOR INPUT INTERFACE FOR BALING MACHINE

(75) Inventors: Timothy C. Stamps, Carl Junction, MO (US); Steven Phillips, Columbus, GA (US); James Dutton, Phenix City, AL (US); Barton Wade Daniel, Kennesaw, GA (US)

(73) Assignee: L&P Property Management Company, South Gate, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/423,750

(22) Filed: Apr. 25, 2003

(65) Prior Publication Data

US 2004/0006402 A1    Jan. 8, 2004

Related U.S. Application Data

(63) Continuation-in-part of application No. 09/919,114, filed on Jul. 31, 2001, now Pat. No. 6,628,998.

(51) Int. Cl.[7] .................. G06F 17/00; G06B 11/01; G06B 15/00; B65B 13/22; B65B 13/28
(52) U.S. Cl. ..................... 700/90; 700/17; 700/83; 100/31; 100/32
(58) Field of Search ............... 700/17, 83, 90, 700/95, 117, 19; 53/138.6, 414; 100/3, 31, 100/32; 206/83.5

(56) References Cited

U.S. PATENT DOCUMENTS

| 2,632,381 | A | 3/1953 | Buckland | 100/7 |
|---|---|---|---|---|
| 2,780,986 | A | 2/1957 | Ritenour | 100/25 |
| 3,070,001 | A | 12/1962 | Feldkamp | 100/25 |
| 3,470,813 | A | 10/1969 | Nomm et al. | 100/4 |
| 3,568,591 | A | 3/1971 | Dunlap | 100/4 |
| 3,621,888 | A | 11/1971 | Ericsson | 140/93.2 |
| 3,720,158 | A | 3/1973 | Sauer et al. | 100/4 |
| 3,834,297 | A | 9/1974 | Husou | 100/3 |
| 3,863,558 | A | 2/1975 | Trumbo | 100/33 |
| 3,910,089 | A | 10/1975 | Meier et al. | 72/146 |
| 3,921,799 | A | 11/1975 | Meier | 206/83.5 |
| 3,935,616 | A | 2/1976 | Simmons | 24/20 EE |
| 4,031,594 | A | 6/1977 | Cepuritis | 24/20 EE |
| 4,048,697 | A | 9/1977 | Duenser | 24/20 EE |

(Continued)

OTHER PUBLICATIONS

IEEE 100 Authoritative Dictionary of IEEE Standards Terms, 7th Edition, Standards Information Network IEEE Press, p. 273.

(Continued)

*Primary Examiner*—Albert W. Paladini
*Assistant Examiner*—Ryan Jarrett
(74) *Attorney, Agent, or Firm*—Husch & Eppenberger LLC; Grant D. Kang

(57) ABSTRACT

An operator interface for a control system for a bulk material baler includes interface means such as a touch screen or keyboard for an operator to enter process parameters into a control system memory. A display shows process parameter fields into which an operator may enter desired control parameters. The display also displays data feedback from baler process sensors. The baler control system then controls baling parameters as the operator directs including: strap feed position, strap feed speed, strap feed torque, strap release tension, tying cylinder position, tying cylinder speed and tying cylinder torque. The operator may also control carriage movement, alarm limits, shut off limits and monitor on the display baler processing data both currently and historically. Other aspects of automated baling may be optionally monitored or controlled through the operator interface of the present invention.

35 Claims, 23 Drawing Sheets

U.S. PATENT DOCUMENTS

| | | | | |
|---|---|---|---|---|
| 4,062,086 A | 12/1977 | Wojcik | | 24/20 EE |
| 4,079,667 A | 3/1978 | Lems et al. | | 100/2 |
| 4,080,689 A | 3/1978 | Meier | | 24/20 EE |
| 4,090,440 A | 5/1978 | Jensen | | 100/4 |
| 4,156,385 A | 5/1979 | Lems et al. | | 100/3 |
| 4,158,994 A | 6/1979 | Jensen | | 100/3 |
| 4,226,007 A | 10/1980 | Duenser | | 24/20 EE |
| 4,228,565 A | 10/1980 | Lems et al. | | 24/20 EE |
| 4,378,262 A | 3/1983 | Annis, Jr. | | 156/73.5 |
| 4,391,186 A | 7/1983 | Davis | | 100/7 |
| 4,403,542 A | 9/1983 | Lewis | | 100/2 |
| 4,450,763 A | 5/1984 | Saylor | | 100/31 |
| 4,466,535 A | 8/1984 | Huson | | 206/83.5 |
| 4,484,518 A | 11/1984 | Jaenson | | 100/4 |
| 4,498,379 A | 2/1985 | Saylor | | 100/2 |
| 4,501,356 A | 2/1985 | Urban et al. | | 206/83.5 |
| 4,520,720 A | 6/1985 | Urban et al. | | 100/26 |
| 4,534,817 A | 8/1985 | O'Sullivan | | 156/352 |
| 4,584,935 A | 4/1986 | Luggen | | 100/26 |
| 4,611,534 A | 9/1986 | Kudlicka et al. | | 100/26 |
| 4,624,179 A | * | 11/1986 | Yves et al. | 100/4 |
| 4,625,635 A | 12/1986 | Lewis | | 100/26 |
| 4,649,812 A | 3/1987 | Mouret | | 100/5 |
| 4,665,815 A | 5/1987 | Fleissner | | 100/2 |
| 4,718,336 A | 1/1988 | Munro | | 100/3 |
| 4,787,425 A | 11/1988 | Saylor | | 140/73 |
| 4,951,562 A | 8/1990 | Ribaldo | | 100/8 |
| 5,039,250 A | 8/1991 | Janz | | 405/15 |
| 5,070,779 A | 12/1991 | Molitorisz | | 100/31 |
| 5,117,536 A | 6/1992 | Beach et al. | | 24/20 R |
| 5,133,532 A | 7/1992 | Figiel et al. | | 254/216 |
| 5,239,919 A | * | 8/1993 | Maki et al. | 100/35 |
| 5,379,687 A | 1/1995 | Moseley | | 100/3 |
| 5,417,320 A | 5/1995 | Velan et al. | | 206/83.5 |
| 5,477,724 A | 12/1995 | Velan et al. | | 72/385 |
| 5,483,837 A | 1/1996 | Velan et al. | | 73/805 |
| 5,546,855 A | 8/1996 | Van Doorn et al. | | 100/11 |
| 5,644,978 A | 7/1997 | Jaenson et al. | | 100/8 |
| 5,673,614 A | 10/1997 | Jaenson et al. | | 100/8 |
| 5,689,934 A | 11/1997 | Scherer et al. | | 53/399 |
| 5,746,120 A | 5/1998 | Jonsson | | 100/4 |
| 5,809,873 A | 9/1998 | Chak et al. | | 100/4 |
| 5,826,499 A | 10/1998 | Bullington | | 100/3 |
| 5,870,950 A | 2/1999 | Wiedel | | 100/33 R |
| 5,889,671 A | * | 3/1999 | Autermann et al. | 700/83 |
| 6,035,773 A | * | 3/2000 | Rempe | 100/2 |
| 6,038,967 A | * | 3/2000 | Chak et al. | 100/2 |
| 6,363,843 B1 | 4/2002 | Daniel et al. | | 100/3 |
| 6,397,738 B1 | 6/2002 | Brown, Jr. | | 100/3 |

OTHER PUBLICATIONS

The American Heritage Dictionary of the English Language, 4$^{th}$ Edition 2000, Houghton Mifflin Company.

Brochure:"Packaging Solutions for Large Products", Automat, Barcelona, Spain, Undated, 16 pages.

Videotape "Cranston Wire Tying" Approximate Date 1985; Approximate Length 4 Minutes.

Videotape: Samuels Strapping System; Mosely Gin, Abbeville, AL; Date as Early as Mar. 31, 2000; Approximate Length 4 Minutes.

* cited by examiner

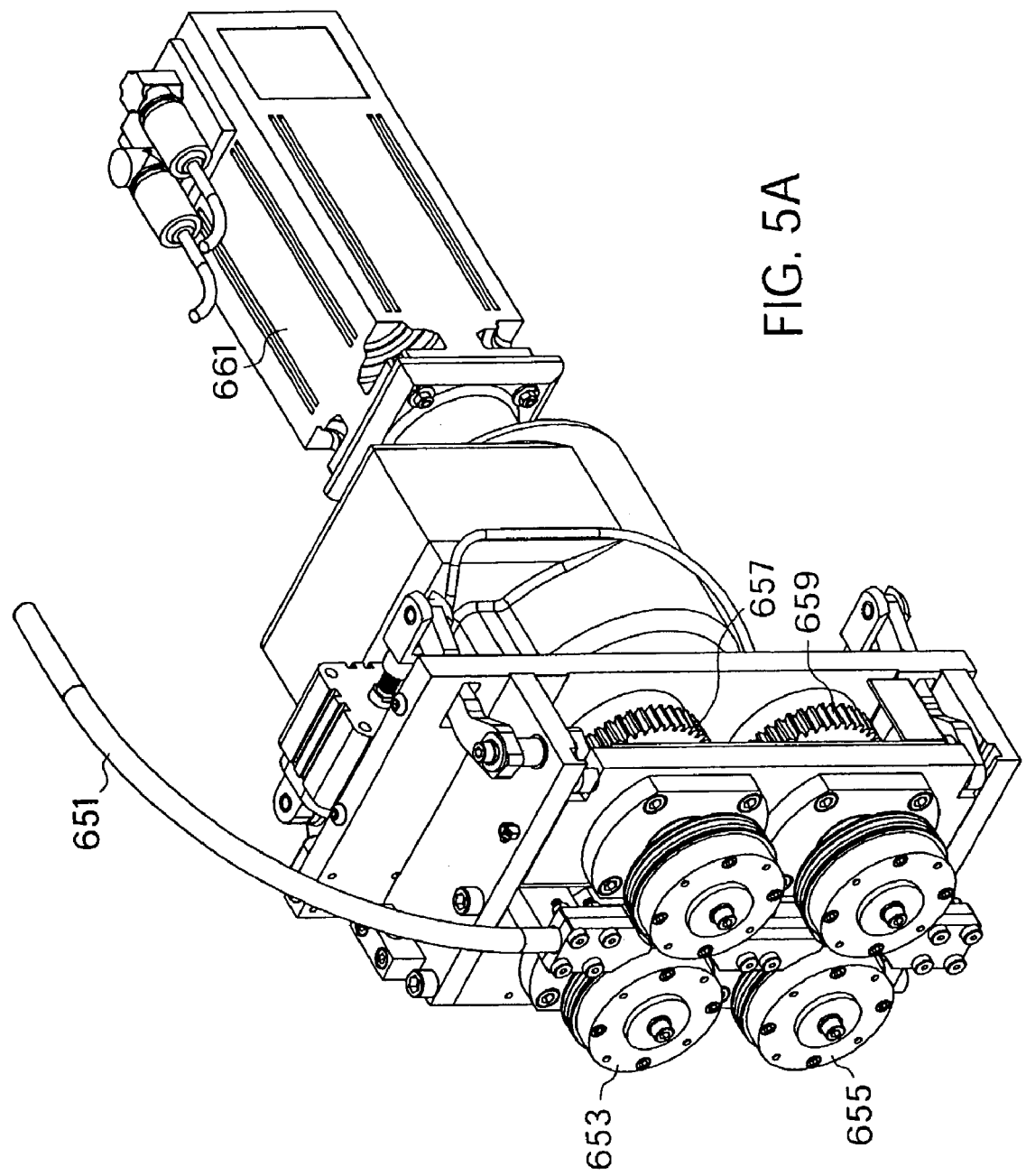

OPERATOR INPUT INTERFACE FOR BALING MACHINE

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. Field of the Invention

This invention relates generally to an operator input interface for a bulk material baling machine that uses a control system incorporating user input parameters for process variables.

2. Related Art

Wire baling of bulk materials benefits from increased speed and reduced materials cost through automation. Bulk materials include fibrous bulk materials such as cotton and nylon. Fibrous materials are commonly formed into bales by simultaneous compression and binding. There is a continuing need in the automated baling art to improve the efficiency, reliability and accuracy of the bale binding process.

Baling wire performance requirements vary depending upon the bulk material being baled. Such requirements range from industry standard specifications to general operational parameters, such as minimum speeds required for profitability. The Cotton Council issues standard baling constraints specifying particular ranges for the length of wire around the bale and the tension that the wire must withstand.

Current automated baling machines use an articulated track to guide wire around bales of bulk material, while that bale is under compression. Part of the wire guide track in current automated balers must be removable to a second position after the ends of the baling wire have been tied together, in order to allow ejection of the bale and insertion into the baler of the next unit of material for baling. Material to be baled is typically introduced into the automatic baler under vertical compression. Typical pressures for an industry standard 500 pound, 20×54 inch bale are in excess of 300 tons. Horizontal plates called follower blocks apply compression through platens which contact the surface of the cotton or other material being compressed. The Platens incorporate slots which run lateral to the longitudinal axis of the bale. The Industry Standard number of binding wires for cotton bales is six. Accordingly there are six slots in the platens. These allow the baling wire to be wrapped around the bale while it is still under compression. The lateral slots have lateral channels behind them for insertion of wire guide tracks in both the upper and lower platens in automatic balers.

In order to loop baling wire around bulk material to be baled, release it from a guide track and knot the ends, tension must be generated on the wire. Likewise, in order to properly knot the ends of the wire, tension must be maintained in the twisting procedure that generates the knot. These tensions must be maintained within prescribed ranges to optimize efficiency and to produce a final bale compliant with industry standards. Certain knotting speeds must be avoided because too much speed in the twisting procedure produces metal fatigue. Too great a degree of tension overall can generate weaknesses or wear-points in the baling wire, or can generate wear in the wire guide tracks or other parts of the automated baling machine.

Current automated baling machines operate with a certain degree of inefficiency. Automated baling machines would benefit from more precise control of such variables as tension, speed and wire position. Precise control of process variables would be best achieved with a system whereby a user may input precise parameters for those variables and whereby precise data feedback is available to the user. Prior art balers have had no such system.

There is a need in the art to increase the precision of controls in order to maximize speed while maintaining adequate compliance with industry standards for material bales produced, in order to minimize wear and damage and to maximize efficiency. There is a further need for more individual user control of operations.

SUMMARY OF THE INVENTION

It is in the view of the above problems that the present invention was developed. The invention is a graphical operator interface for a control system that governs an automatic bulk material baling apparatus. The control system incorporates Programmable Logic Controllers ("PLCs") and data structures within memories capable of controlling a plurality of process control variables. Each bale wire loop on a bulk material bale is produced by an individual "head." Each head incorporates drive wheels and a fastener or "knotter." Each set of drive wheels and each fastener of the present invention is powered with independent electro-servo motors. Each motor is considered an "axis" of control. Each servo motor has operation variables such as speed and torque. In addition, each head uses a tensioning gripper, moveable tensioning pins, a cutter and in some cases limit switches, all of which are controllable by the control system of the present invention. The dynamic memory of the control system is configurable to precisely control all relevant variables according to operator input parameters.

Control is affected through the PLC of the control system. Each axis of control has a separate memory space in the control system, so that each head may be controlled individually. The PLC and memory of the present control system track the precise position of the drive wheel shafts and fastener head shafts at all times to within a thousandth of an inch. Thus, the control system can precisely measure and control position and speed. The system constantly measures the amperage of current being used by the electro-servo motors controlling the drive wheels and tying cylinders of the knotter. This current quantity corresponds to a quantity of torque in a known ratio. Torque levels may be pre-configured at optimal parameters in the control system's memory. Precise torque control benefits wire tensioning and knot tying.

Configuring the variable parameters like torque and wire position in the memory data structure is achieved through the user interface of the present invention.

In operation, the position tracking of the present control system allows precise control of the speed of the progress of baling wire around the bulk material. Upon completion of its loop around the bulk material, the baling wire progress is arrested by means of electro servo position data feedback. The wire is then gripped with a tensioning gripper. The drive wheels are then reversed in order to generate a pre-configured degree of tension on the baling wire. This tension is precisely controlled by the control system of the present invention with its pre-configured memory of the desired torque on the drive wheels, which is precisely monitored by constant servo motor feedback of the amperage drawn. Similarly, current feedback is monitored in the fastener electro-servo motor, which drives rotational tying cylinders. Both torque control and position control are used by the control system to efficiently control the tying of a knot in the baling wire in a fashion that maximizes speed while remaining within industry standard strength and tension limits. After looping the bale wire, releasing the wire guide track, tying the knot and cutting the wire, the control system is pre-configured to release the bale wire loops and allow the completed bale to be ejected.

The baling apparatus control system is also pre-configured to control the sequential progression of the bale compression apparatus, moveable guide track sections and ejection apparatus. This is done through permissive process control memory which sequentially signals activation of the next step in the process upon receipt of a signal that the previous step is complete. Process status is constantly displayed to the operator by the present invention.

Wire feed position, torque and speed, knotter position, torque and speed, tensioning torque and other process variables are all configured in memory by operator interface of the present invention. Storage and feedback of these variables is also performed by the present invention.

In operation, a user views a touch screen series and inputs selected parameters in field windows for each variable. Further control is available through data feedback, manual override and a emergency settings in the present invention as well.

Further features and advantages of the present invention, as well as the structure and operation of various embodiments of the present invention, are described in detail below with reference to the accompanying drawings.

BRIEF DESCRIPTION OF THE DRAWINGS

FIG. 5A is a view of the wire feed drive.

DETAILED DESCRIPTION OF THE PREFERRED EMBODIMENTS

The Automatic Baler

Figure 1:
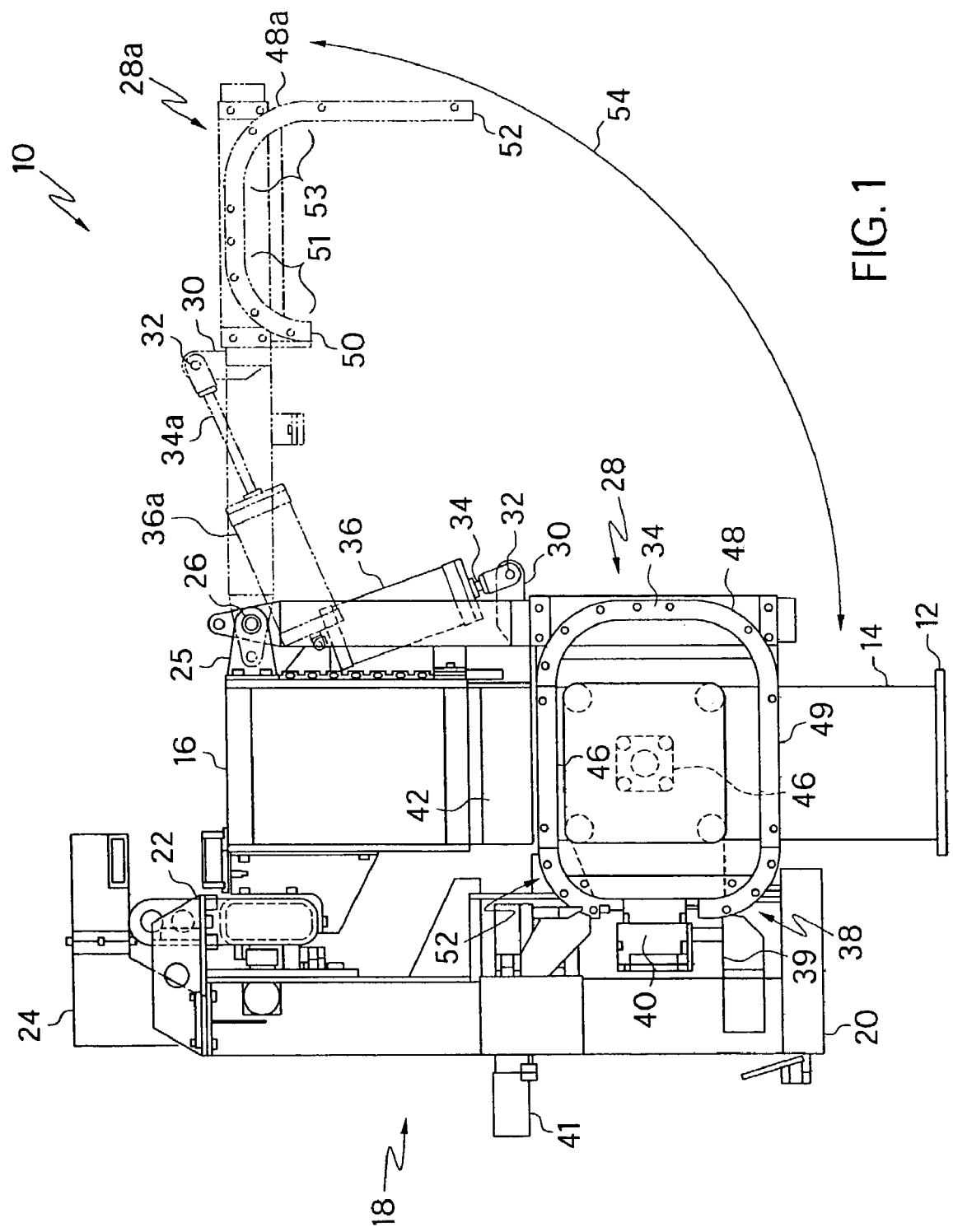
FIG. 1 is a side view of an automatic baling machine.

Referring to the accompanying drawings in which like reference numbers indicate like elements, FIG. 1 is a view of an automatic baling machine. The bale binding apparatus, 10, is depicted to show two positions; the solid lines illustrate a first position wherein a moveable wire guide track section, 48, and moveable wire guide track section support strut assembly, 28, are in a first position to complete a wire guide track trajectory when bale binding is occurring; and the broken lines illustrate a second position wherein the moveable wire guide track section support strut assembly and moveable wire guide track section are removed to a second position, 28. The second position allows ejection of the finished, bound bale. A third "ready" position, not shown, is between the two illustrated positions. In the "ready" position, the wire guide tracks are clear of the bale compressor, but not high enough to be clear of the ejector.

A floor plate, 12, supports vertical support stands, 14, on either side of the bale binding station, 46. A binding assembly carriage, 18, is born by stands, 14. The base extension, 20, of the carriage, 18, carries the fixed wire feed fastening heads, 40, and attached fixed first section of wire guide track, 38. Extending from the upper forward extent of the stands, 14, are a pair of pivot axis brackets, 25, holding the pivot axes, 26, which carry the moveable guide track support strut assembly, 28. Extending forward from the center of the strut assembly, 28, is a member, 30, pivotally connected at pin, 32, to piston arm, 34, which is extended and withdrawn by action of the piston. The action of the piston, 36, may be by any means but is preferably pneumatic.

Also extending forward from the center of the strut is mechanical arm, (not shown), pivotally connected to the carriage at a pin. The arm monitors the position of the strut assembly, and so may be located at any arbitrary position between it and the carriage stands. It contains a cylindrical passageway through which a shaft travels. Incorporated in the mechanical arm's cylinder and shaft are proximity switches. The first proximity switch corresponds to the first, baling, down position of said moveable wire guide track section support strut assembly. The third proximity switch corresponds to the ejection or fully up position of the moveable wire guide track section support strut assembly. The middle proximity switch corresponds to the middle, ready position between depicted first and second positions. This middle position is a rest position which is far enough removed from the baling station for the moveable wire guide track sections to stay clear of the station and avoid collision with the entry into the station of the next volume of material to be baled. The ready position is not as far removed from the baling station as the second, ejection, position. This rest or "ready" position increases cycle speed. A variety of deployments of proximity switches are equivalent, providing only that they report guide track strut positions to the PLC.

The depicted embodiment incorporates a two section wire guide track including a first fixed wire guide track section, 38, and a second moveable wire guide track section, 48. It is to be understood that this description is illustrative and not limiting. Accordingly, the present invention may also effectively be deployed in balers with three, four or more wire feed-fastener heads, two, three or more wire guide track sections, or two, three or more guide track support strut positions.

The binding wire entering the apparatus, 10, from the wire supply (not shown) at the wire drive-fastener head, 41, is directed by wire guide track sections, 38 and 48, from and to the head, 40, where the wire is tied into a closed loop.

The Operators Input Interface

The graphical user interface of the present invention presents the user with a series of cascading screens in graphical display. In the preferred embodiment the graphical display is a cathode ray tube touch screen. LDCs or other displays are equivalent. There are approximately 35 screens in the top level, some of which cascade to lower level screens providing more detailed information on various parameters or feedback.

Figure 1A:
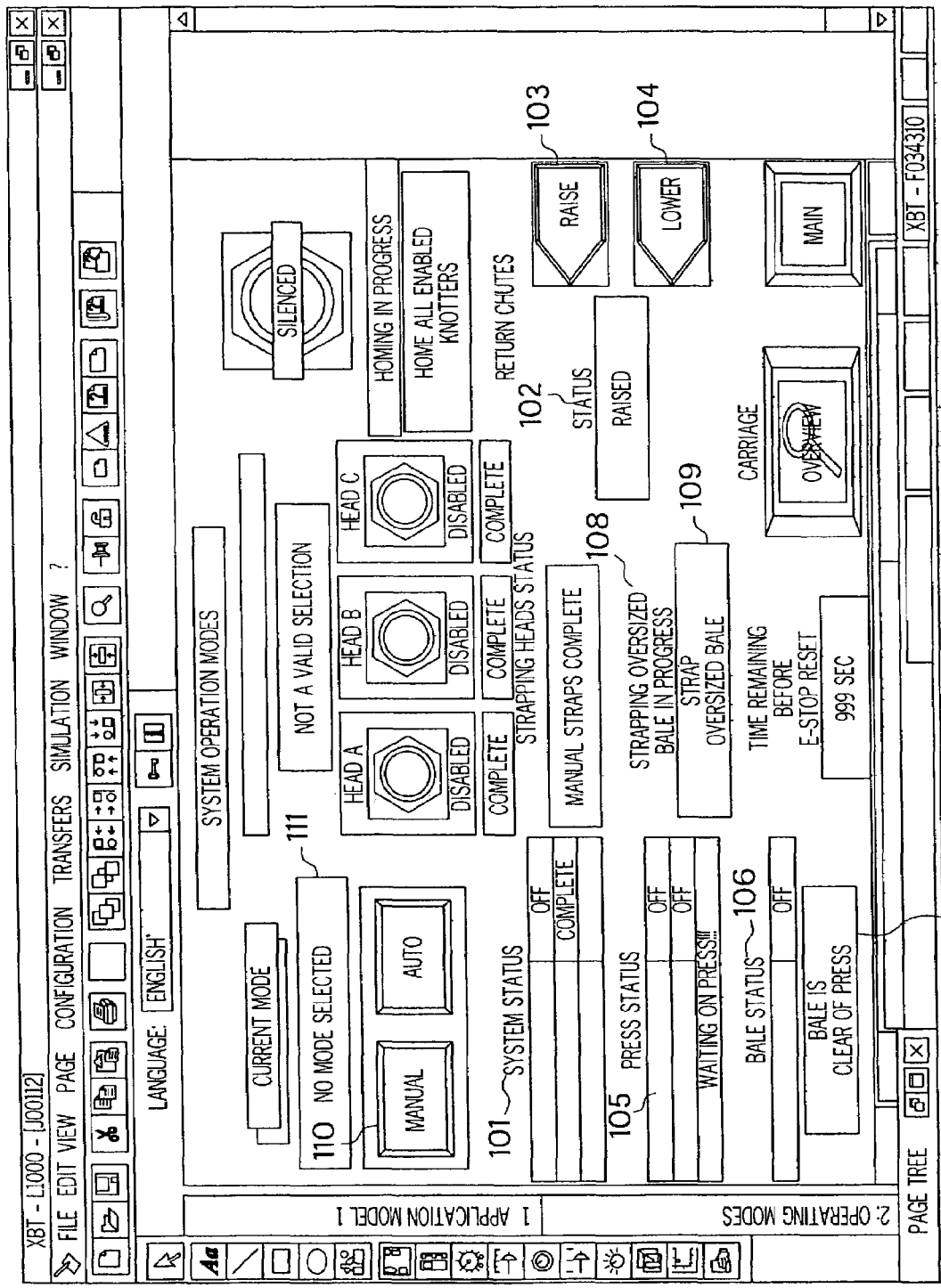
FIG. 1A is the "system operating modes" screen.

FIG. 1A is the "system operating modes" screen. This screen displays to an operator the status of various components of the automatic baler depicted in FIGS. 1 and 2. System status, 101, displays whether the baler is in automatic or manual mode, and whether baling is in progress or complete. The moveable guide track section position, abbreviated as "return chutes," is displayed at status window, 102, as "lowered," "raised" or "parked." Raised corresponds to the fully up or ejection position. Parked corresponds to the "ready" position. From this screen the user may also manually control chute position with raise or lower buttons, 103 and 104.

Figure 2:
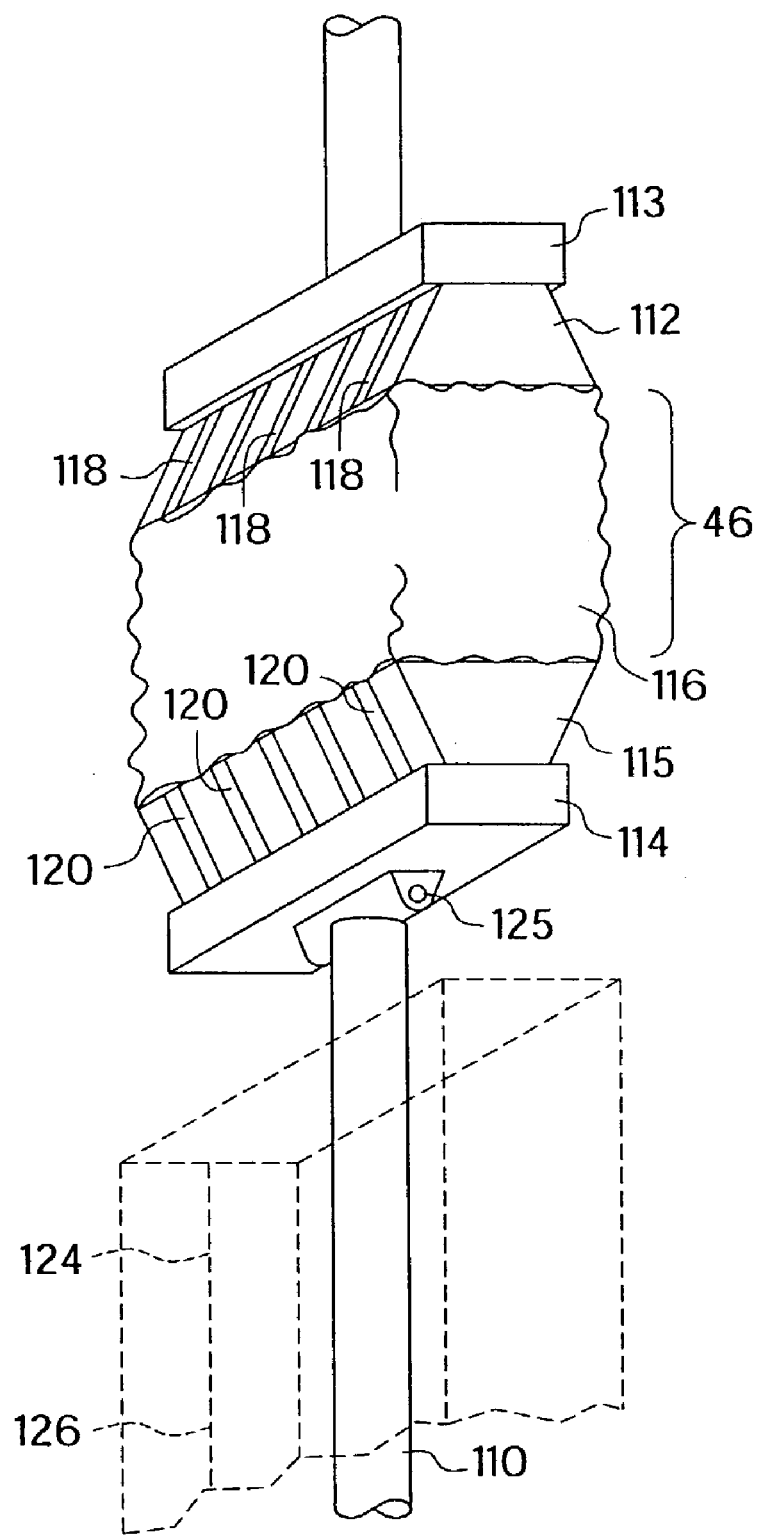
FIG. 2 is an oblique view of compression apparatus.

FIG. 2 depicts the bale compression apparatus sometimes called the "press." Typically a bale compression apparatus will be oriented vertically in order that a volume of material may be introduced into the bale binding station, 46, either from below or above. The present invention may be incorporated in a baler designed to accommodate a compression apparatus oriented in any direction. The embodiment depicted is vertically aligned with the bulk material to be baled entering the baling station from below. An upper following block, 113, holds an upper platen, 112, oriented to face the rising bulk material for baling, arrest its upward progress and buttress the material during compression against the force of the rising lower compression elements. Moveable compression shaft, 110, elevates a lower following block, 114, on which is attached a lower platen, 115, which elevates and then compresses a volume of bulk material for baling, 116. Both upper and lower platens contain channels, 118, and 120, to receive wire guide track sections therein. The platen faces (not shown), which abut and compress the bale, also incorporate lateral slots through which baling wire may be released by the wire guide track sections, in order to come into binding contact with the bulk material to be baled.

Limit switch, 124, is engaged when the lower compression apparatus elements have arrived at the bale binding position. Limit switch, 126, is engaged when the lower compression apparatus is lowered.

Typical cotton gin compression apparatuses have automatic mechanical means by which a bound bale is ejected from the baling stations as the lower compression shaft, 110, descends after baling. Typically this automatic mechanical ejection means incorporates a pivot, 125, between the lower following block and lower compression shaft. A mechanical arm, not shown, tilts the lower following block on the pivot, 125, a sufficient amount for the bound bale to fall from the lower platen onto a receiving area, which frequently has a conveyor belt to convey the bound bale away. The compression apparatus has limit switch, 126, which is engaged when the lower compression shaft has descended enough for a finished, bound bale to have been ejected from the baling station and, if necessary corresponding to sufficient time for the finished bale to be conveyed out of the path of the moveable guide track section. When a bale has moved a sufficient distance for the moveable guide track section support strut assembly to return from ejection position to rest position, there to await arrival of the next volume of bulk material to be baled, the PLC outputs a signal for the track to move to the ready position.

In FIG. 1A the "system operating modes" screen displays the status of the compression apparatus, called the "press" at 105. Press status field, 105, displays whether the press is far enough up to be in the "strapping window," whether it is fully "raised," or whether it is lowered, which is indicated as "waiting on press." This screen also displays the status of the ejection process at the "bale status" window, 106. The bale status window indicates that the bale has been completely ejected from the path of all moving parts, depicted as "clear of press," or not, depicted as "active." There is also a manual information input, "bale is clear of press," 107.

A property of cotton and other bulk material commonly baled by the depicted presses and by machines incorporating the present invention is that the material will not always compress to a completely uniform size and shape in an identical fashion on each cycle. Sometimes the vertical dimension of the bale is somewhat oversized, usually within a margin of two inches or less. Also, sometimes the surface of the bale will not be completely level. Typical cotton press apparatuses accommodate this relatively slight variation of bale dimensions. The user control interface of the present invention also incorporates this flexibility. If an oversized bale does not sufficiently conform to standard size to continue the automatic processing of its baling, but nevertheless is close enough to standard size for the baler to bale it, the operator may order an oversized bale strap. This is indicated on the press status as "strapping window." The "strapping window" is where the press is not fully up, but still high enough for the moveable guide track to descend and close. "Strapping oversized bale in progress," is indicated at 108. Touching the screen at the "strap oversize bale," 109, button initiates this process.

Automatic baling needs to have a manual override capability for repair, maintenance or other atypical situations. The "system operating modes" screen in FIG. 1A accommodates control of this status at the "manual/auto," 110, button, and further displays the current mode at field, 111.

Wire feed-fastener heads are individually controlled. The status of each individual head, homing of the individual heads and alarm status are also displayed and controllable at the "system operating modes" screen. These features are controllable in greater detail at subsequent screens, and will be described below.

The Operating Cycle

In operation, a cycle begins with the baler moveable guide track section support strut assembly, 28, and its mechanical arm in the ready position, the wire feed-fastener head, 41, in the ready position and the compression apparatus in the down position. The compression apparatus lower shaft, 110, following block, 114, and platen, 115, elevate a volume of bulk material to be baled into the baling station, 46. Upon reaching baling position, the bale position limit switch, 122 in FIG. 2, signals the baling machine control system PLC either directly from the compression apparatus, which may have a relay system or its own control system PLC. This signal closes a "relay" in the baler PLC, completing a circuit which outputs a signal to the baler moveable guide track section support strut assembly and its mechanical arm to progress from ready position to the down or baling position.

When the moveable guide track reaches the down position, the guide track loop completely surrounding the bale is complete, and ready to receive the baling wire. When the moveable guide track reaches the down position, a proximity switch on its mechanical arm signals to the PLC that the moveable guide track is down. This signal closes a relay in the baler PLC completing a circuit which outputs a signal to the wire drive-fastener head to feed the wire. This process is reviewed in detail below.

After baling, the wire drive fastener head signals the baling control system PLC that the knots in the baling wires have been completed. This completion signal closes a relay in the baler PLC, completing a circuit which outputs a signal to the moveable guide track support strut assembly to move to the fully up position. Upon reaching the up position, the baler moveable guide track support strut assembly mechanical arm proximity switch signals the baling control system PLC, closing a relay in the ejection circuit.

The baling machine control system PLC ejection circuit signals the compression apparatus control system PLC that the bale is ready for completion. The control system PLC signals the press to lower, decompressing the bale. This allows expansion of the bulk material to progress in a downward direction until restrained by the tightening of the baling wires. The lowering of the lower following block, platen and the bound bale riding on top of them automatically engages the mechanical ejection apparatus, (not shown.) Although cotton gin compressors use a variety of mechanical apparatuses, typically a cam and arm arrangement is used to tilt the lower following block (co-axially with the pivot depicted at 125 in FIG. 2) such that the bale simply falls off the lower platen by gravity. The completed bale is then removed. When the completed bale is clear of the path of the transit of the moveable guide track, the baling control system PLC is signaled, either by a proximity switch associated with the conveyor belt, or associated with a corresponding position of the lower compression apparatus. This signal closes a relay in the baler PLC, completing a circuit which outputs a signal to the moveable guide track to descend from the fully up position to the ready position. The lower compression apparatus then retreats for receipt of the next volume of bulk material to be baled. The compression apparatus then elevates the next volume of bulk material to the baling station, and the cycle repeats. Each step of this process is displayed by "system," "press" and "bale" status displays, 101, 105, and 106 respectively.

Carriage Control

Bulk material bales are typically bound with six wires or straps. For the commonly used "standard density" cotton bales, the Cotton Council requires that a standard 20×54 inch cotton bale be bound with six wires or straps, each 9¼ inches apart from one another. Current automatic baling machines, including a preferred embodiment of the present invention, have three wire feed-fastener heads associated with three bale wire guide tracks. Three head automatic balers bind bulk material with six wires by repeating the baling process. The three wire feed-fastener heads are mounted on a carriage approximately eighteen inches apart. The first, third and fifth baling wires are tied in place after which the carriage translates 9¼ inches sideways, whereupon the second, fourth and sixth bale wires are tied in place. A six head embodiment would still translate, so that baling would continue if one head broke.

Figure 3:
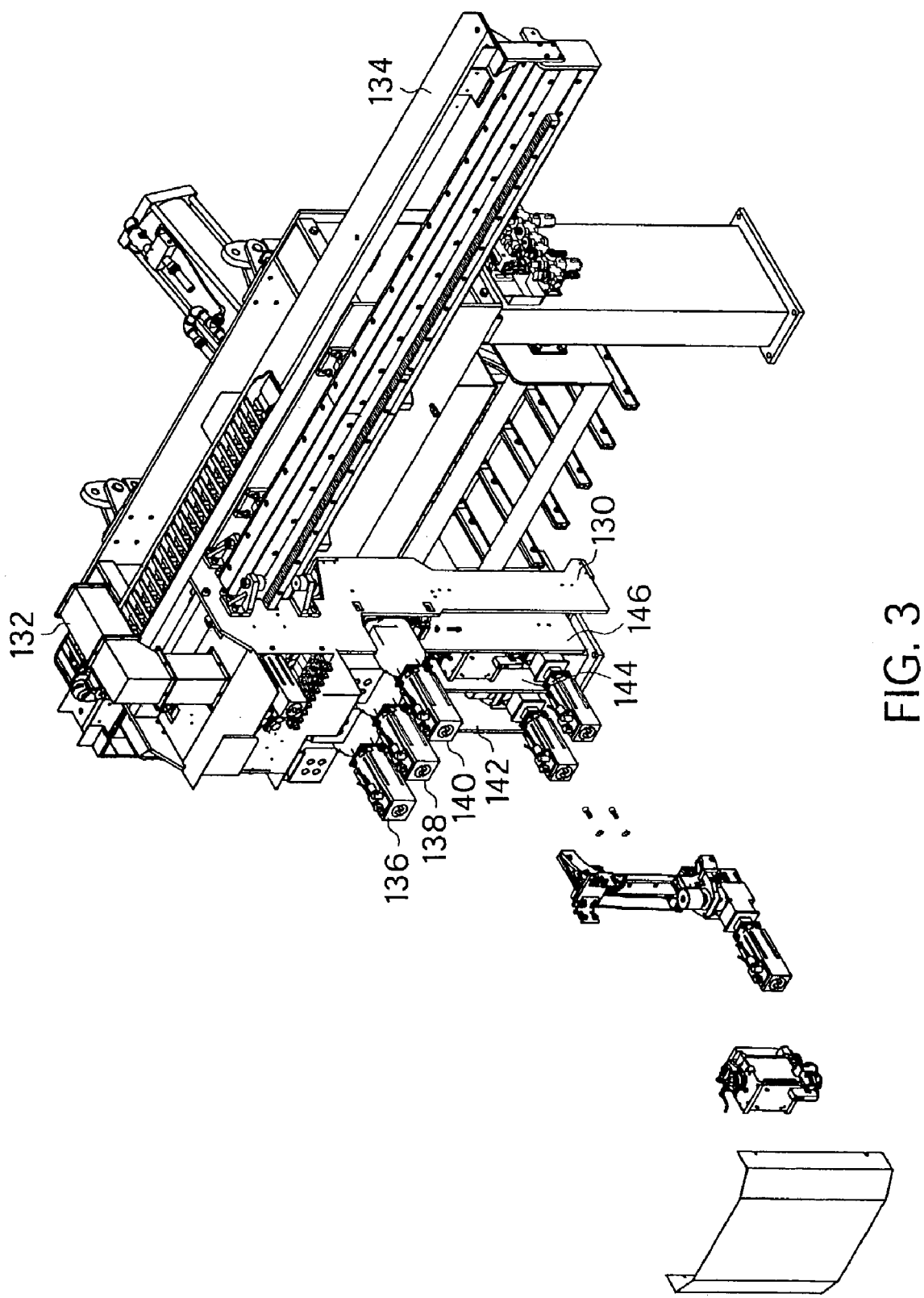
FIG. 3 is a view of the carriage of the automatic baling machine.

FIG. 3 is a front view of the carriage. The carriage, 130, has a pinon, 132, which rides on a rack, 134, parallel with the longitudinal axis of the bale. Translation across this axis is powered by a carriage electo servo motor. On the carriage are mounted three wire feed-fastener heads, 136, 138 and 140, mounted on head brackets, 142, 144, and 146. These components are enumerated in greater detail below, in FIG. 5.

Figure 3A:
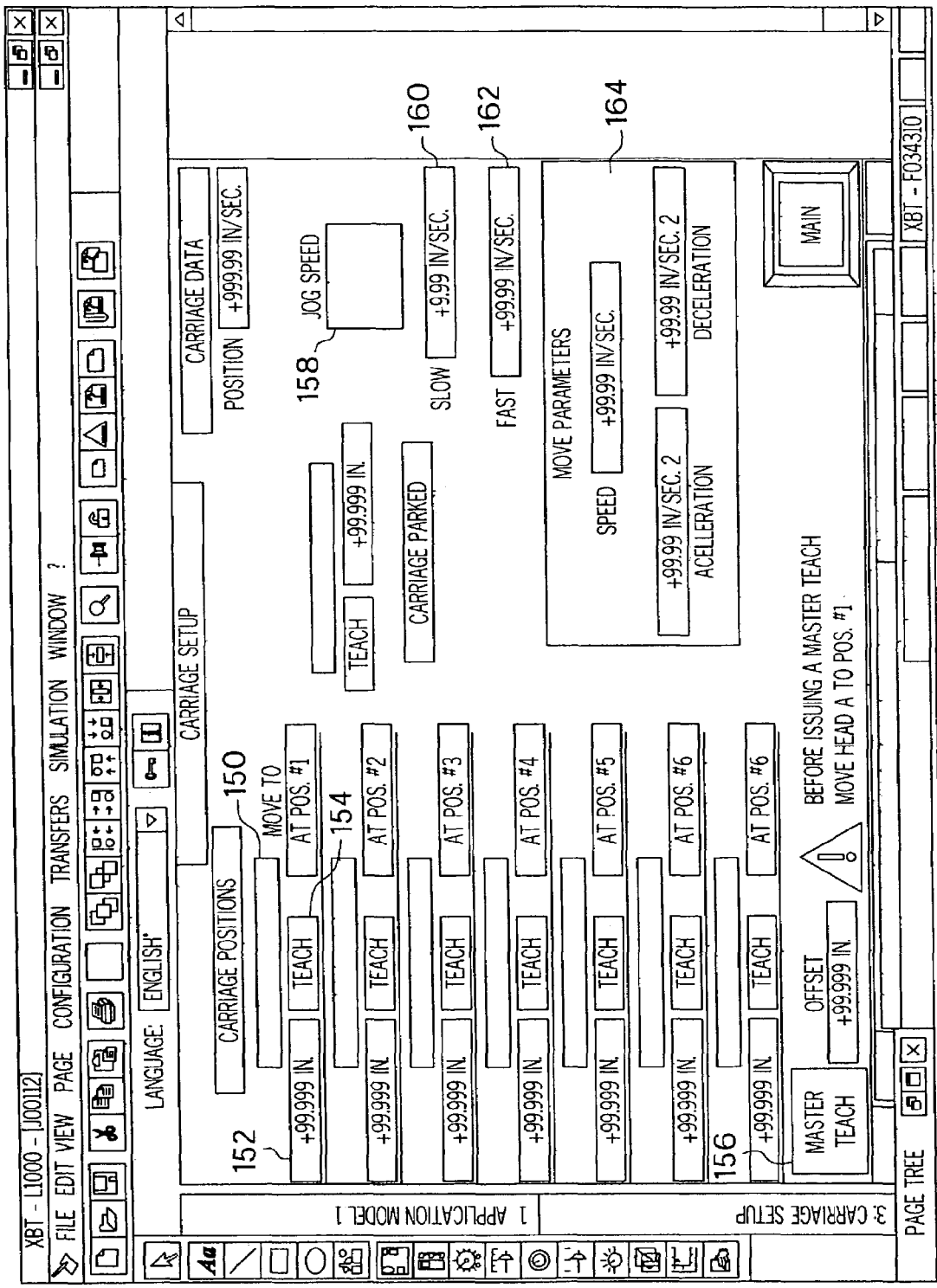
FIG. 3A is the "carriage setup" screen.

Control parameters for the carriage process variables are input and monitored by the operator, according to the present invention, at the screens depicted in 3A, 3B and 3C. FIG. 3A contains a series of seven initialization buttons, 150, and six absolute position fields, 152. An operator may input the desired position of each baling wire along the longitudinal axis, by individually inputting the absolute position information of each head individually using the "teach" buttons at 154. Individual control is useful for continuing baling operations should one head malfunction, and for other atypical situations. Alternatively, a user may teach the desired positions of all six bale wires at once by using the "master teach" input at 156.

The "carriage set up" screen of FIG. 3A also allows control of carriage translation speed. Input control button "jog speed," 158, allows initialization of a slow speed, typically on the order of one inch per second, at field 160, and a fast speed, typically on the order of ten inches per second, at field 162. Through monitoring of the drive shaft of the carriage electo servo drive motor, precise position information is available by using the control system and data structure of the present invention. Precise control is further enhanced by using a slow speed at the beginning and end of a translation move. Cycle speed is increased by using a fast speed throughout most of the translation move. Accordingly, automatic position feedback from the carriage drive servo to the control system of the present invention allows the operator to input a short acceleration beginning portion of a translation move, a fast middle portion and a short, concluding deceleration section of the translation move. The desired rate of acceleration and deceleration are recorded at the fields displayed in the "move parameters" box, 164.

Figure 3B:
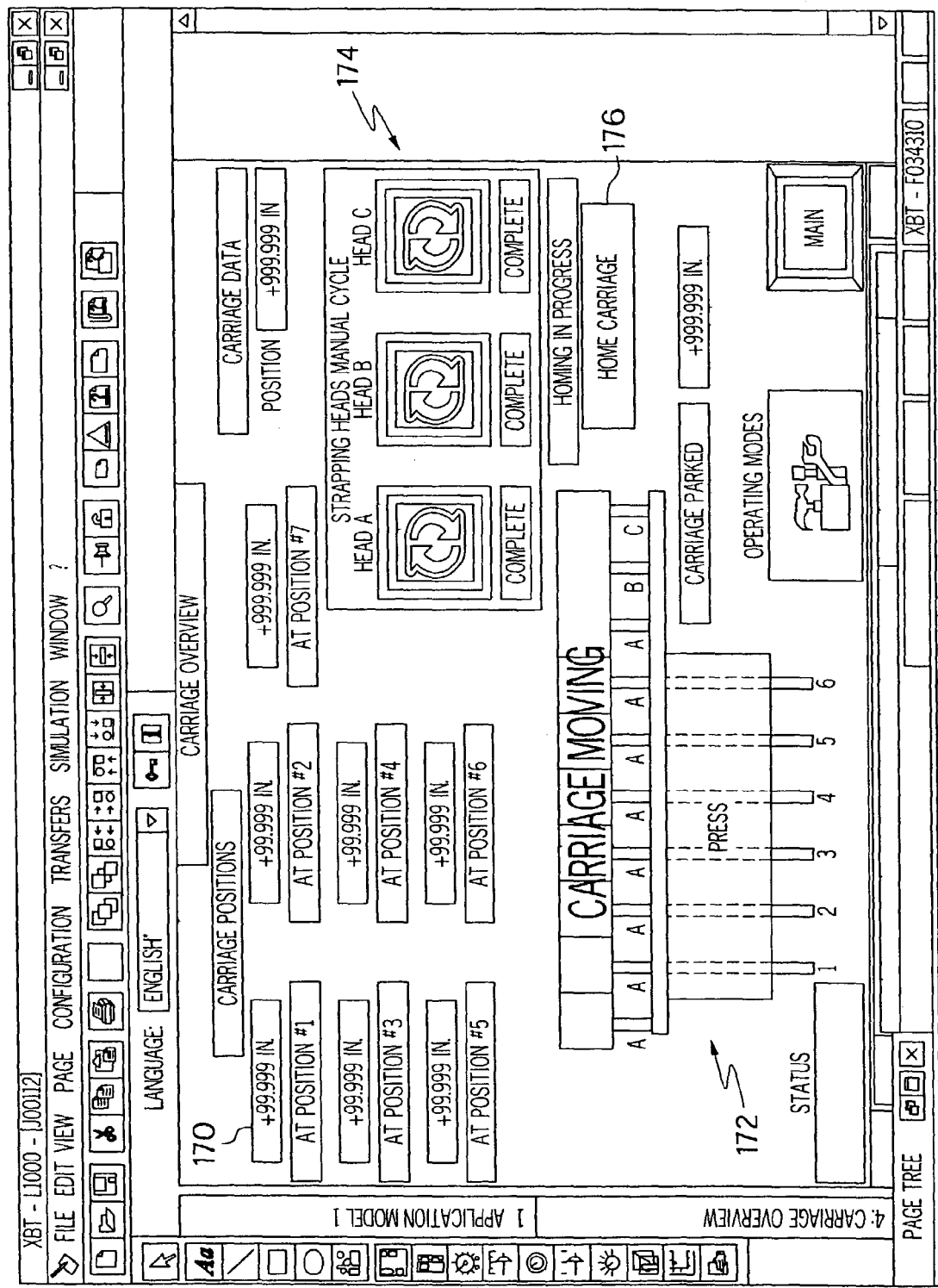
FIG. 3B is the "carriage overview" screen.

FIG. 3B, "carriage overview" displays data feedback for the operator. The numerical representation of the carriage position is given in fields, 170. A graphic representation of the carriages position and whether or not it is moving is given at window 172. A graphic representation of whether or not the wire feed-fastener heads are still in operation, or have completed their operation are given at windows 174. This screen allows the user to instruct the carriage to return to its home position at button, 176.

Figure 3C:
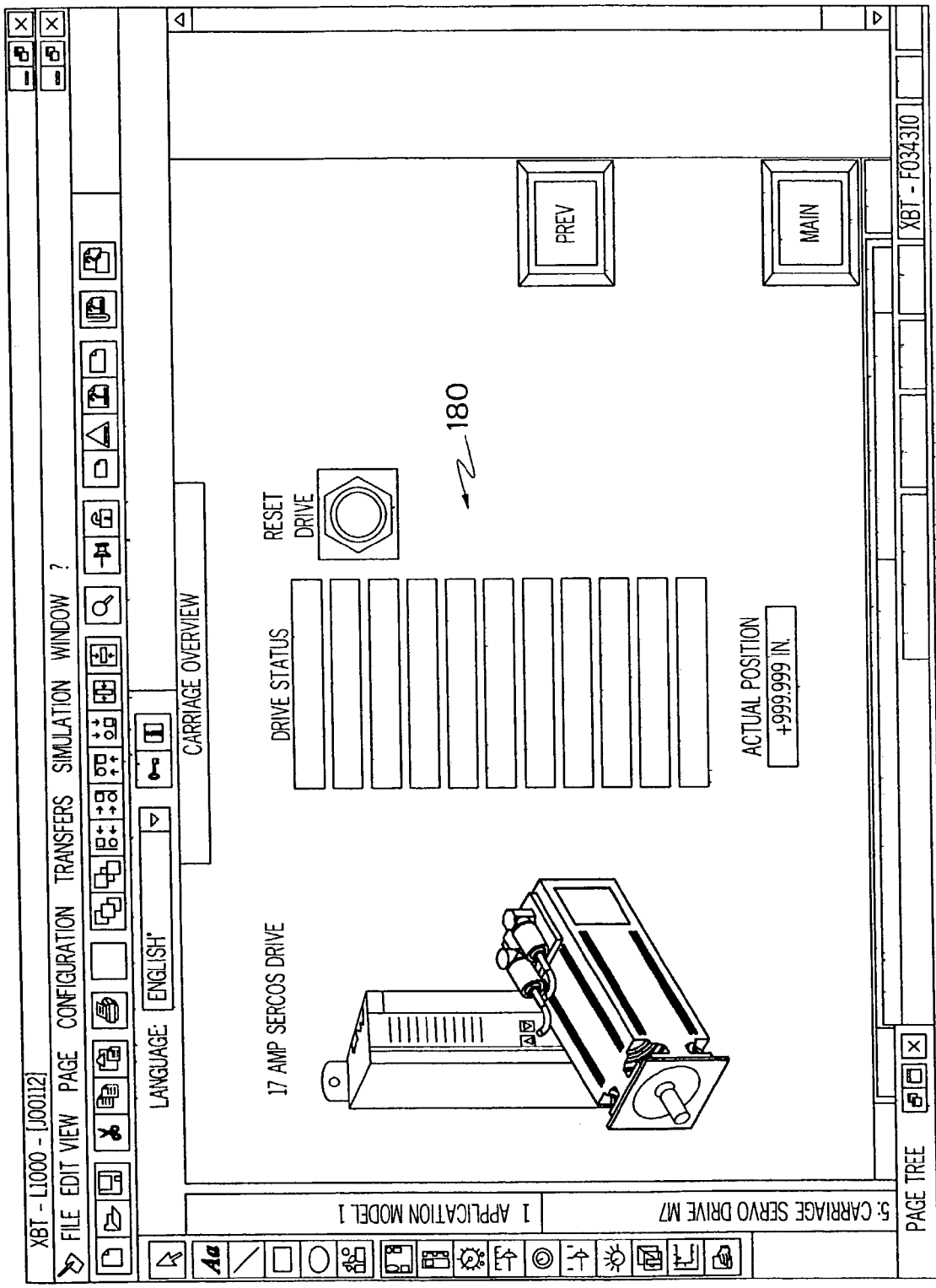
FIG. 3C is the "carriage servo drive" screen.

FIG. 3C, "carriage servo drive motor M7" displays the status of a plurality of possible faults known in the servo motor arts including, for example, configuration error, communication error, summary faults, drive faults, command faults, and feedback regarding whether or not homing is in process or what position the servo is in. Lower level screens with fault details are linked to this screen. These are displayed severally at fields 180.

Process Control

Figure 4:
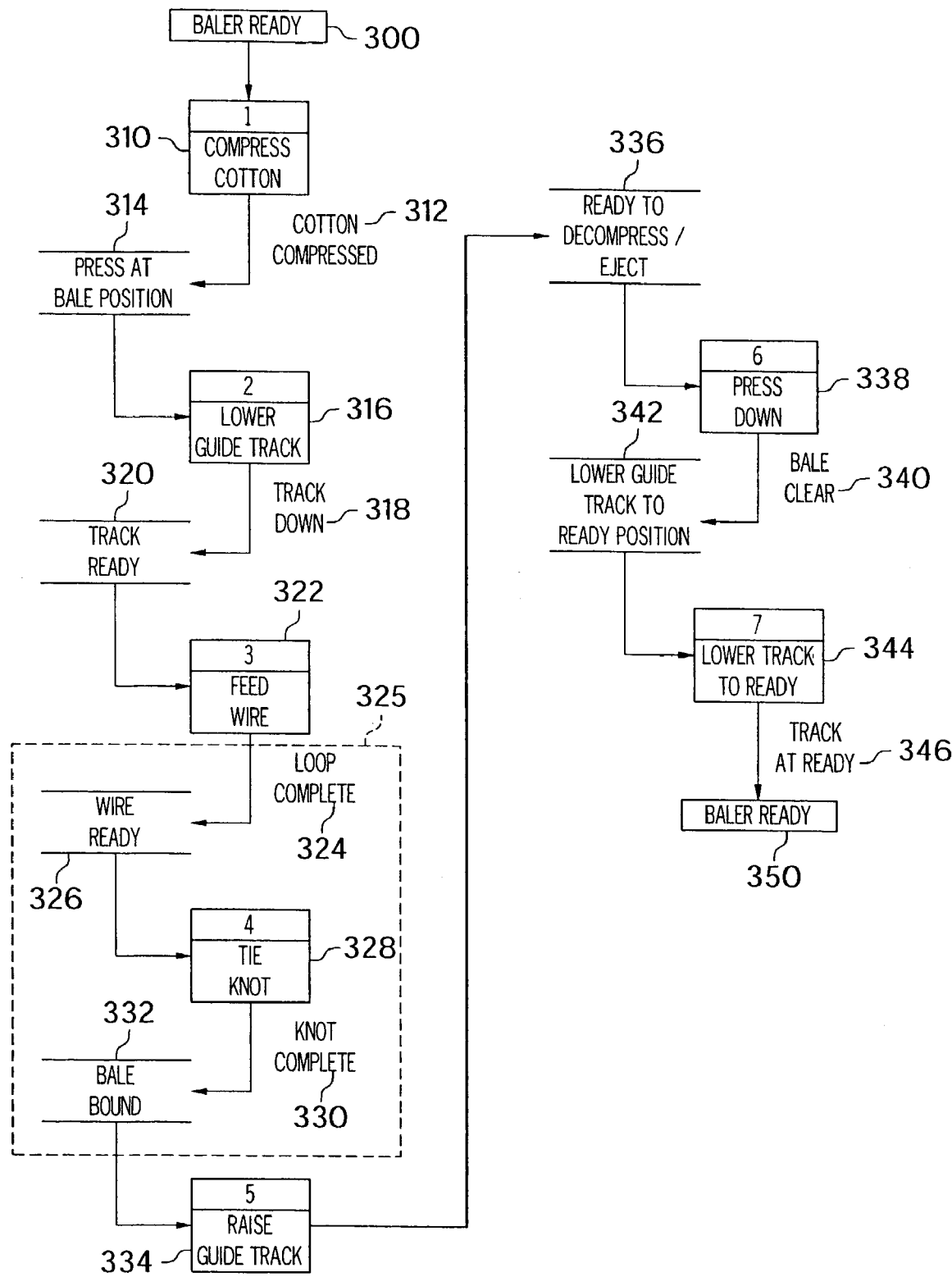
FIG. 4 is a view of a flow chart of the baler control system process.

FIG. 4 is a flow chart diagramming the baling process as governed by the baler control system. The square boxes, 300 and 350, indicate terminal positions of the automatic baling machine. The numbered boxes indicate a physical process step. The parallel horizontal lines indicate a data status in the baler control system PLC. The language within the data status parallel lines describes the most recently completed relay circuit in the PLC. Arrows leading from the process boxes to the data status bars are data status signals from proximity switches, limit switches, or electro servos on the baling machine. The language adjacent to the signal arrows are the data being signaled to the PLC. Each of these arrows represents a data status signal which closes a relay and completes a circuit described within the data status bars. Arrows proceeding from underneath the data status bars towards the next process box are PLC output signals that actuate the next process step. These signals are output in response to the completing of a data status circuit which was completed by closing relays in response to input data signals from the previous process box. In this fashion, the control system method governs the step-by-step functioning of the entire baling process as executed by the controlled automatic baler of the present invention.

Beginning terminal box, 300, "baler ready" indicates that the compression apparatus is down, the wire feed head is in the ready position and the moveable guide track is also in the ready position. The compression apparatus compresses the cotton, 310, completing process step number one. Upon reaching its fully up position, a proximity switch in the compression apparatus sends the "cotton compressed" signal, 312, to the PLC. This closes a relay in the PLC data status circuit dedicated to the up and "ready to bale" position of the compression apparatus, 314. This circuit outputs a signal to the guide track to lower, 316. Process step number two, 316, is lowering the guide track to the full down position. A proximity switch, 318, signals that the track is down to the PLC data status circuit dedicated to the readiness of the track to receive the wire, 320. When the track ready circuit, 320, is completed, it outputs a signal to the wire feed-fastener head to feed the wire, 322. When the wire feed physical process step is complete, the feed drive electro-servo sends the "loop complete," 324, signal to the PLC. This closes a relay in the PLC circuit dedicated to "wire ready," 326, which outputs a signal to actuate the next process step, "tie knot," 328. Upon completion of the knot, the "knot complete," 330, signal is sent from the fastener head to the data status circuit in the PLC dedicated to completion of the binding, 332. The "bale bound," circuit, 332, upon completion, outputs a signal for the next process step, step number five, "raise guide track," 334. The wire feed-fastener process has been greatly simplified for the purposes of flow chart diagram in FIG. 4. The simplified portion of the process is outlined in dotted line, 325. This process is diagramed in detail in the flow chart depicted in FIG. 6.

The fifth process step is to raise the moveable guide track section to a fully up position. When this position has been reached, a proximity switch signals "track fully up" to the PLC. This signal closes a relay in the PLC circuit dedicated to "ready to decompress/eject," 336. Upon this circuit being complete, it signals the compression apparatus to begin lowering, process step number 6, 338. The preferred embodiment of the present invention is consonant with the compression apparatuses found in most cotton gins, which automatically eject a completed cotton bale by mechanical means as the lower compression apparatus descends. In an alternative embodiment, the "track fully up" signal could complete a PLC circuit that not only outputs a signal to the compression apparatus to descend, but also outputs a signal to an alternative ejection apparatus to eject the bale.

A proximity switch on the lower compression apparatus, or, alternatively, on a bale removing apparatus, such as a conveyer belt, signals "bale clear," 340, to the PLC. Receipt of the "bale clear," signal, 340, by the PLC data status circuit dedicated to return of the mobile guide track to the ready position, 342, causes this circuit to output a signal to actuate the final process step, "lower the track to ready," 344. When the moveable guide track section lowers from its fully up position to its ready position, a proximity switch on the moveable guide track mechanical arm signals that the "track is at ready," 346. This signal completes a data status circuit in the PLC dedicated to actuating the cycle to begin again, which is depicted in FIG. 4 as the terminal status, "baler ready," 350. In actuality, the signal from the PLC upon completion of this circuit would signal the compression apparatus to elevate the next volume of bulk material for baling to the baling station, to begin a new cycle.

As described above, each of these process steps is updated in the various status windows in FIG. 1A, the "system operating modes" screen.

Figure 5:
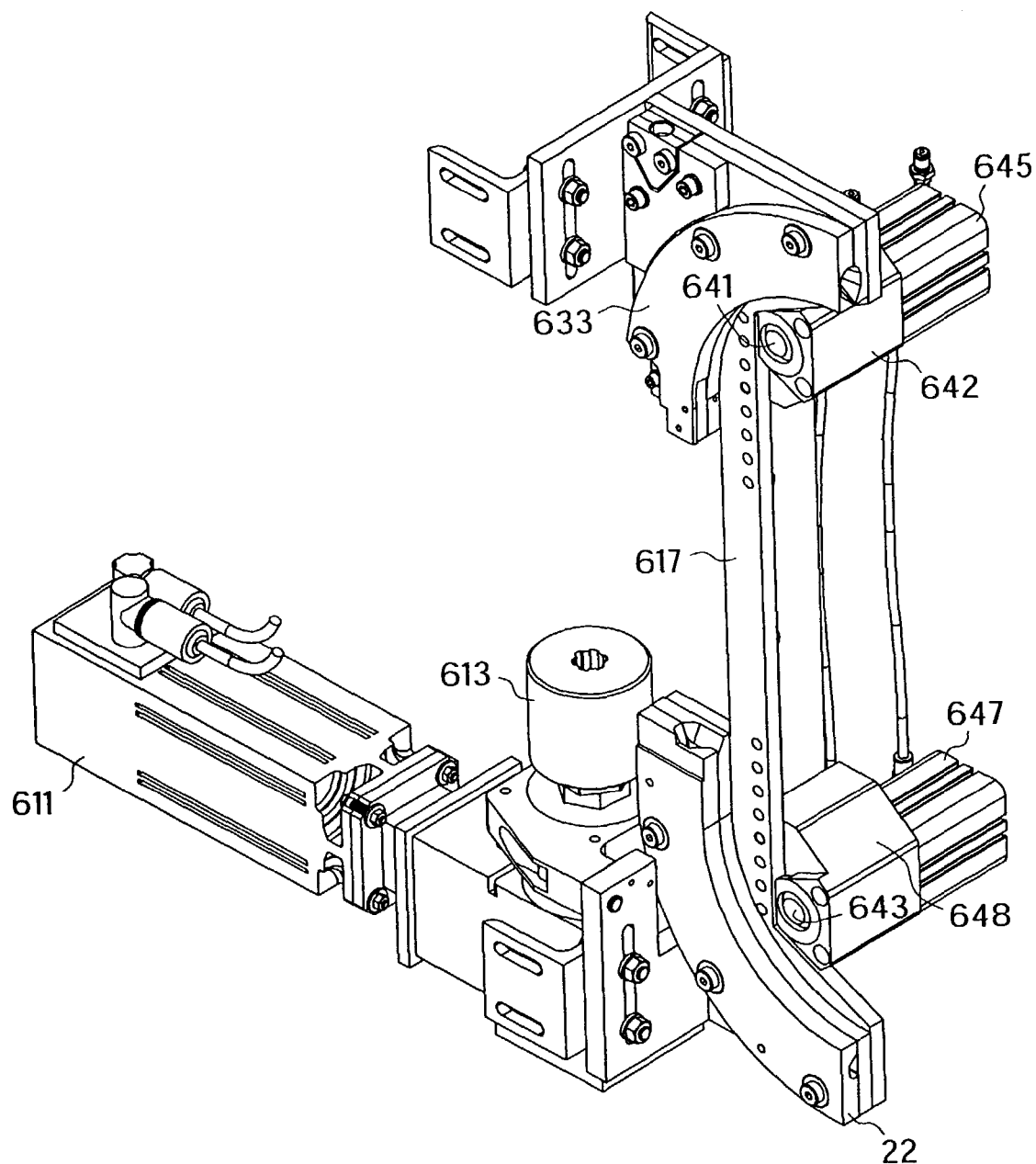
FIG. 5 is a view of an individual head of an automatic baling machine.

FIGS. 5 and 5a are views of the configuration of components within a wire feed-fastener head used in the present invention. Head walls (not shown) separate the components of a head from those of the adjacent head. Bracket, 617, provides a mounting plate for components. Baling wire enters the head from a wire dispensing station (not shown). Wire guide, 651, directs the progression of the wire between two pairs of drive wheels, 653, and 655 in the drive assembly shown in FIG. 5a. Drive wheels, 653 and 655, are driven rotationally through gears, 657 and 659, engaged to drive shaft (not shown), powered by electric servo motor, 661. The drive assembly depicted in FIG. 5a engages with the rest of the tying head by being fixed to a carriage head. The drive wheels direct the progress of the baling wire into a channel within a first, fixed section of wire guide track, 22. The first fixed section of wire guide track, 22, redirects the direction of the progressing bale wire from a downwards direction to a horizontal direction corresponding to a receiving end of a horizontal second section of guide track (not shown). The drive wheels push the wire through the entire guide track circuit and back to the head.

After its circuit through the wire guide track and around the bale, the baling wire re-enters the head from the upper fixed wire guide track section, 633. In the preferred embodiment, reaching a pre-configured position signals a deceleration in the speed of the wire transit. This occurs a short distance before its terminal stopping position, at a limit switch. Typical wire transit speeds are in the range of about ten feet per second. Decelerating from that speed in the last two to four inches of the wire's transit promotes more accurate positioning of the wire since the limit switch can respond more precisely when the wire travel is slower. This also retards excessive wear on all drive parts from abrupt stops.

A tensioning gripper (not shown) then extends to hold the baling wire in a fixed position. Two tensioning pins, 641, and 643, are activated by solenoids, 645 and 647, to extend into the plane of the bale wire loop and inside the circumference of the loop. After gripping and holding the baling wire, a signal is sent to the drive wheels' servo motor to reverse direction whereupon the drive wheel pairs, 653 and 655, frictionally tension the baling wire in a direction opposite its original progression around the bale. Tensioning of the wire produces an inward pressure on the wire which is predetermined to be of sufficient strength to overcome the restraining pressure of the wire guide track. Wire guide tracks are designed to guide and hold a baling wire along its proper path and then release the wire when tension is applied to it so that the wire comes into contact with the bulk material bale and tensioning pins. In the preferred embodiment this is achieved by each wire guide track section being comprised of two longitudinal halves, whose inside faces have channels in them through which the wire progresses. The two halves are held together by pressure means, typically springs. The spring pressure and wire tensioning pressure are pre-configured to contain the wire within the track during transit, and then release it upon completion of the transit and reverse tensioning of the wire.

Tensioning the wire is also required for proper operation of the fastener. Upon being sufficiently tensioned to exit the wire guide track, the ends of the wire are ready to be tied by the fastener. During tensioning, the bale wire is drawn tight against the tensioning pins and bale. The tensioning pins cause the bale wire loop to tension into a position without sharp bends, and thereby allow knotting of the ends with greater efficiency and less likelihood of either weakening the wire or wear to the ends of the wire guide track sections. The tensioning pins also assure maintenance of the proper wire length.

The fastener must generate a knot which is compliant with industry standards for knot tension strength. For example, a standard density bale requires that "The breaking strength of the wire must be not less than 4,350 pounds with a joint strength of not less than 2,600 pounds." Joint Cotton Industry Bale Packaging Committee, 2000 Specifications for Cotton Bale Packaging Materials, Section 1.2.2.3, Approved Materials, Wire Ties, high tensile steel 0.162 inch diameter, 200 KSI wire. The knot fastener is comprised of a servo motor, 611, which drives a tying cylinder, 613, which rotates a predetermined amount, and, through a gear reduction box, produces eight to ten twists in the baling wire ends, knotting them together. A cutter (not shown) cuts the proximal end of the baling wire.

The ends of the knot have been held, and, upon completion of the knot, are released, by mechanical grooves in a known fashion. The baling control system PLC signals the drive wheel servo to rest after the baling wire knot is tied. The PLC signals the servo motor to counter rotate the tying cylinder, after the wire has been released, so that the tying cylinder returns to its original, ready position. The baling control system PLC also signals the tensioning gripper to be released and the solenoids to retract the tensioning pins.

The baling control system PLC receives the tying servo complete signal as the signal that the knot is tied. This corresponds to the "knot complete" signal in FIG. 4. Upon receipt of this signal, the baling control system PLC signals the compression apparatus PLC to release compression, and, thereby eject the bale. This cycle repeats.

Figure 6:
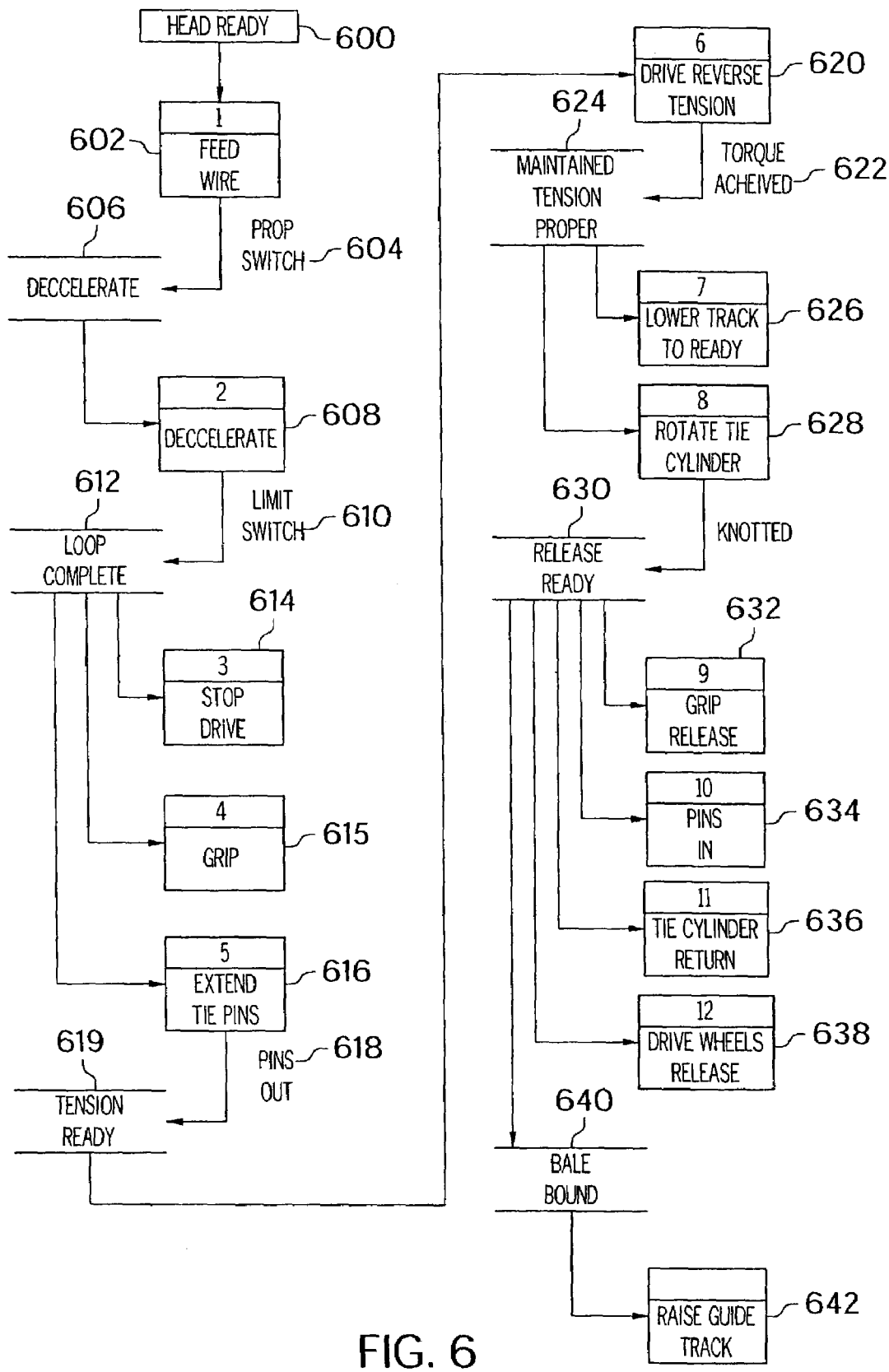
FIG. 6 is a flow chart of the wire feed-fastener head control system process.

FIG. 6 is flow chart diagramming the wire feed-fastener head process. In operation, the baling cycle begins with both the drive wheel servo and the tying servo having signaled a permissive "ready" signal to the baling control system PLC. Having received the proximity switch signal from the moveable guide track support strut mechanical arm that the moveable guide track section is in baling position, the baling system PLC, 600, signals the drive wheel servo, 602, to drive the wheels and frictionally propel the baling wire through the guide track.

When the leading edge of the wire reaches a pre-configured position, 604, a signal is sent to the deceleration circuit of the PLC, 606, and closes a relay therein. The ready to decelerate data status circuit when completed outputs a signal, 608, to the wire feed drive servo to decelerate.

After completing its circuit around the bale the leading end of the baling wire arrives at the "limit switch," 610. In the preferred embodiment, PLC data array is pre-configured with the proper bale wire loop length, and receiving the data from the electro-servo motor that a number of drive shaft revolutions corresponding to that length has been reached, serves as a "limit switch." The limit switch signal is received by the "loop complete" data status circuit, 612, which outputs a signal to the drive wheel servo to halt, 614. The "loop complete" data status circuit also signals the tensioning pin solenoids to extend the tensioning pins into the plane of the bale wire loop, 616, and to grip the wire end, 615. When the pins are out, the wire is ready for tensioning, 618.

Next the "tension ready" circuit signals the drive wheel servo to reverse direction and frictionally tension the baling wire, 620. The baling control system memory has been pre-configured to relate predetermined desired tensions with corresponding torques generated by the drive servo, which in turn correspond to predetermined electric servo current amperages. The PLC receives a signal from the drive wheel electric servo motor that the amount of current corresponding to the tension in the wire required to release the wire from the retaining force of the wire guide track has been reached. The control system continues the amount of current necessary for the reverse frictional drive to maintain the proper predetermined tension in the wire during tying. Upon the wire's release from the wire guide track and consequent contact with the bale and tying pins, the drive wheel electric servo motor signals the baling control system PLC that current demand has increased, as the electric servo continues to tension the wire against the bale and tying pins. The baler control system memory signals the baler control system PLC, 622, to maintain the drive wheel electric servo current at a predetermined level, in order that the desired, predetermined tension in the wire is maintained between the tensioning gripper at the distal end of the baling wire and the drive wheels, frictionally gripping the proximal end of the wire. Upon the receipt by the baler control system PLC, 624, that this predetermined tension has been maintained for a predetermined amount of time, typically a fraction of a second, the baler control system PLC, 626, signals the wire cutter to actuate and cut the baling wire between the wire drive wheels and the bale wire dispenser (not shown).

Next the "maintained tension" data status circuit, 624, signals the control system PLC to actuate the tying cylinder servo to effect tying a knot in the bale wire ends, 628. The tying head servo ties the knot in a known way through rotation of cylinders which produces eight to ten twists in each bale wire end. Through a gear box reduction factor of eight to one or ten to one, the knot is tied with less than ten rotations of the tying cylinder heads. Typically approximately one rotation of each of two tying cylinders heads is required.

The present invention affords precise control of the tying cylinders through a torque monitoring switch which compares the amount of current amperage being used by the tying cylinder servo motor to a pre-configured amount in the control systems memory. Moreover, the servo drive shaft position for the tying cylinder is received by the baling control system memory on a constant basis, so that the precise position of the tying cylinders is always known. Prior art fasteners were unable to operate as efficiently as the fastener torque, speed and position control of the present invention.

After the knot is tied, the tying head servo motor signals the position of the tying cylinder corresponding to a finished knot to the baling control system. The "release ready" data status circuit, 630, then cuts off current to the drive wheel servo motor, 638, returning said drive wheel electric servo motor to the original "ready" position. The tying cylinder electric servo is rotated in the reverse direction of the tying direction, 636, the same number of degrees as it was rotated in the tying direction, to also return the tying cylinders to the ready position. The tensioning grip is released, 632, and the tensioning pins withdrawn, 634, from the plane of the bale wire loop. Thereupon the "bale bound" circuit, 640, signals the moveable wire guide section support strut assembly to move to ejection position, 642, the compression apparatus PLC to release compression and the ejection arm to eject the bale from the baling station, 640. This cycle repeats.

Figure 6A:
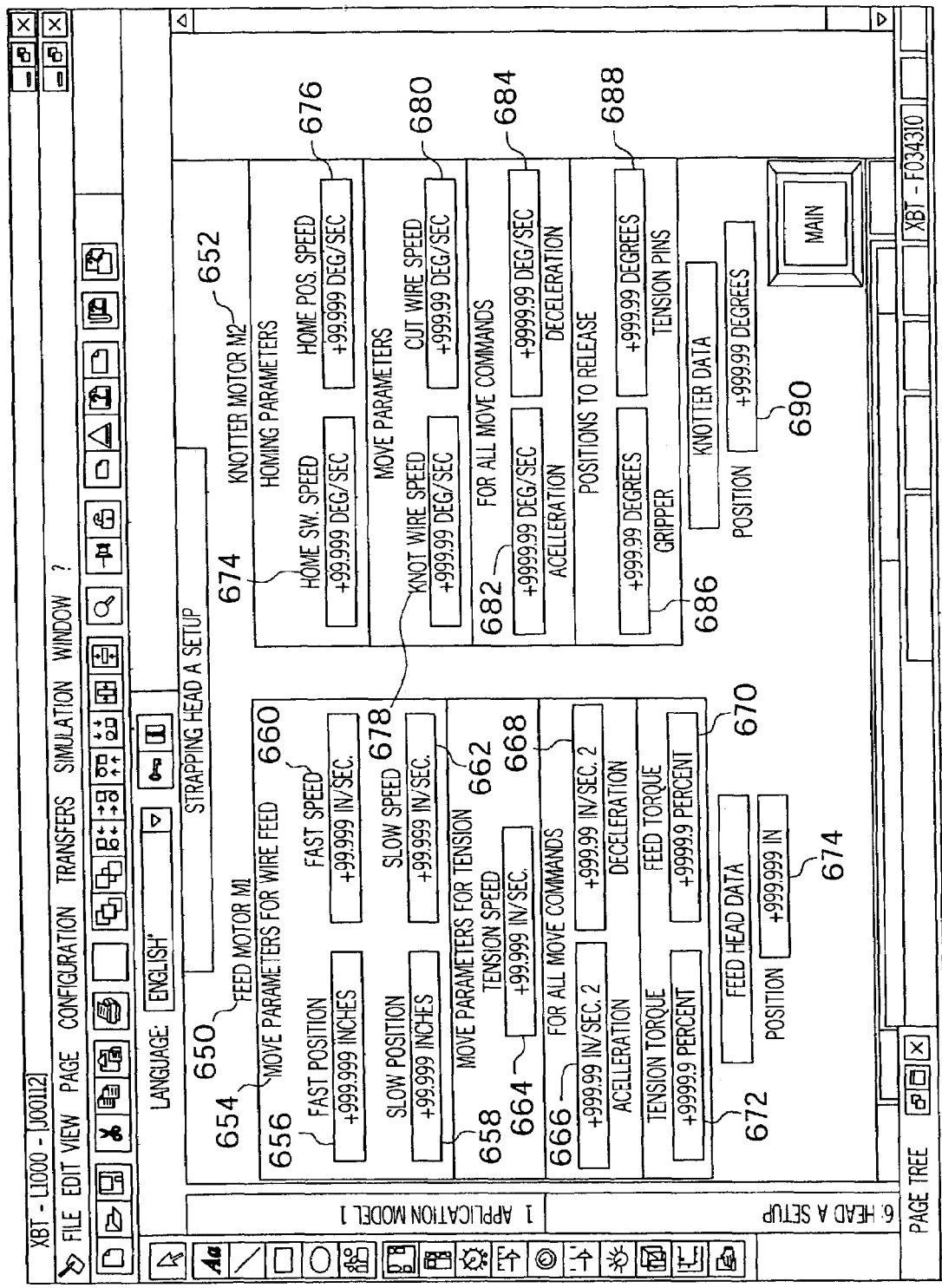
FIG. 6A is "strapping head setup" screen.

FIGS. 6A and B represent the screens controlling the wire feed-fastener head control and data feedback. FIG. 6A, "strapping head A setup" reflects the status of the wire feed drive servo in box 650, labeled "feed motor M1." The fastener servo motor parameters are described in window 652, entitled "knotter motor M2." The head is described as "Head A" in the screen title because these screens are repeated for each of the individual heads. In the preferred embodiment there are three heads, labeled "A," "B" and "C". Under "feed motor M1" are first listed "move parameters for wire feed," 654. As with the carriage drive servo, greater position accuracy is promoted by using slow speeds at the beginning and end of the baling wire transit loop. Cycle speed is increased by using a faster wire transit speed throughout a middle section of the wire transit circuit, which middle section comprises the great majority of the distance traveled by the baling wire. The fast position field, 656, indicates the position of the leading end of the wire at which the control system of the present invention will increase the speed from the slow to the fast speed. Typically this is approximately two inches from the beginning of the transit of the wire through the loop. "Slow position" field, 658, indicates the position at which the wire speed will be reduced, commonly approximately two inches from the end of the wire circuit loop. The "fast speed" field, 660, allows the speed in inches per second to be input by an operator. The "slow speed" field, 662, allows the slow speeds at the beginning and the end of the wire transit to be input by an operator.

The next subheading under "feed motor M1" is "move parameters for tension." This corresponds to the reverse direction rotation of the drive wheels that will pull back on the proximal end of the baling wire in order to create the tension necessary to release the wire from the wire guide track. The operator may input an optimal "tension speed" at field, 664.

The next subheading under "feed motor M1" provides an acceleration field, 666, and a deceleration field, 668, which apply, "for all move commands." By inputting optimal figures for inches per second squared, the user may help optimize the balance between precision and wear avoidance on the one hand and cycle speed on the other. The next fields under "feed motor M1" include "feed torque" at field, 670. As discussed above, the drive servo and PLC are configured to monitor the amperage of current drawn by the drive servo, which, by means of a pre-configured data structure, is known to correspond with a desired torque. Exceeding the torque input by the user in the "feed torque" field, 670, establishes the level at which a wire jam alarm and shutdown may occur. By a similar pre-configured monitoring means, the "tension torque" for the reverse tensioning of the wire may be set by the user in field, 672, at a level that is sufficient to release the baling wire from the wire guide tracks, but not too high to cause wear or weakening of the wire or slippage of the drive wheels against the wire. At the bottom of the "feed motor M1" data column is, "feed head data-position," 674. Electro servo motors precise tracking of axle position allows equally precise measurement of the length of wire dispensed. This allows the user to input the absolute length of the baling wire necessary to conform to standardized bale sizes. Typically the wire length is 88 or 94 inches in circumference, with an additional amount, typically 20 inches, to accommodate the overlap of the proximal and distal ends of the baling wire for use in knotting.

FIG. 6A also illustrates the user input fields for the "knotter motor M2," 652. The knotter operates by means of physical tying cylinders which rotate to twist a knot in the wire ends. The position data is measured in degrees in order to be consistant with cylinder rotation. In a fashion similar to the feed motor position and speed controls, the knotter controls use the drive servo's precise position capabilities to control speed, acceleration and deceleration. Under "homing parameters" a home switch speed, 674, is established for a rapid rotation of the tying cylinders back to a home or start position after tying a knot. This speed is maintained until a few degrees from the final precise homing position, after which the homing position speed, as entered in field, 676, slows the tying cylinder so that a precise home position can be reestablished.

The speed at which the wire is knotted is a crucial parameter. Twisting the knot too quickly will make the wire more brittle, potentially causing it to fail industry standard strength requirements. Twisting the wire too slowly will produce a loose knot. An optimal speed may be entered by the operator in the "knot wire speed" field, 678. At the end of the knotting rotation, continued rotation of the tying cylinders through a sufficient angle will also actuate a mechanical wire cutter to cut the proximal end of the wire, releasing the knotted baling section of wire. A different optimal speed for this process step may also be entered by the user at, "cut wire speed" field, 680. In a fashion similar to the wire feed input fields, "acceleration" and "deceleration" fields, 682 and 684, may be used to enter these rates for the knotter in degrees per second.

Smooth and sequential functioning of the knotting procedure also benefits from precise control of releasing the tensioning devices. The "gripper" field, 686, and the "tension pins" field, 688, allow the user to establish the precise position of the tying cylinders in degrees at which these process steps are actuated. The final knotting field, "position," 690, allows the user to input the total number of degrees the tying cylinder will rotate throughout the knotting cycle.

Figure 6B:
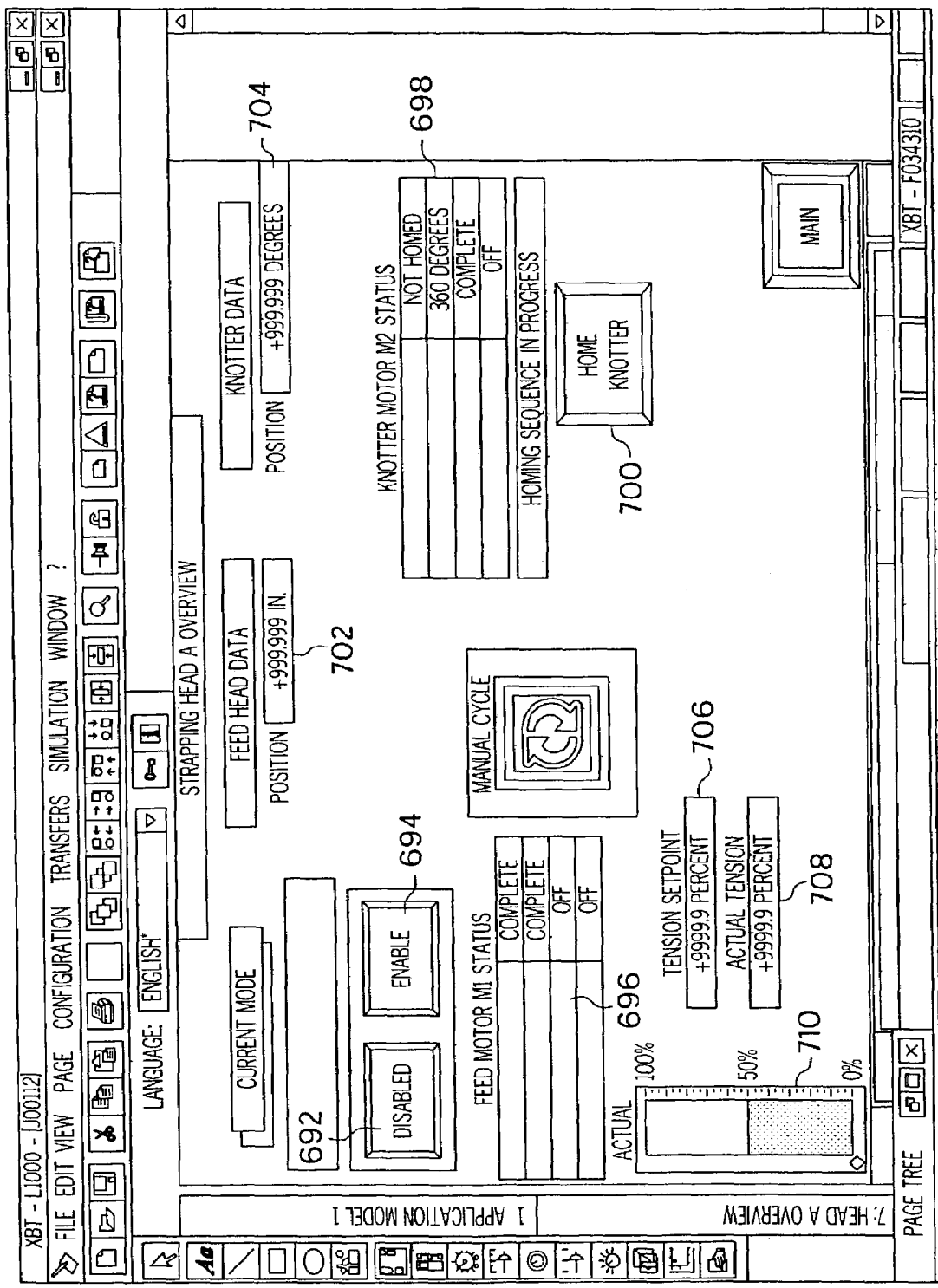
FIG. 6B is "strapping head overview" screen.

FIG. 6B depicts the screen with which tension is controlled and other data is fed back to the user. Mode control switches "disable," 692, and "enable," 694, allow each individual head to be automatically or manually controlled. Feed motor status is displayed at field, 696. Displayed are: "wire feed" as "active" or "complete;" "tension cycle" as "active" or "complete;" "manual feed" as "active" or "off"; and "manual tension" as "active" or "off." Knotter motor status is displayed at field, 698. Displayed are: "home reference" as "Homed" or "not homed"; "knotter location" as "__ degrees"; "knotter cycle" as "active" or "complete"; and "manual knotting" as "active" or "off."

Knotter tying cylinders may be returned to home position with the use of the "home knotter" button, 700. The current absolute position of the leading end of the baling wire is displayed at "feed head data-position" field, 702. The current degrees of rotation of the tying cylinders is displayed at "knotter data-position" field, 704. The operator may set the tension desired, according to the servo monitoring system of measuring amperage and comparing it to pre-configured correspondence with torque and tension stored in PLC memory as described above, by setting the tension at field, 706. Feedback of the actual tension is displayed numerically at field, 708 and graphically at bar graph, 710.

Figure 6C:
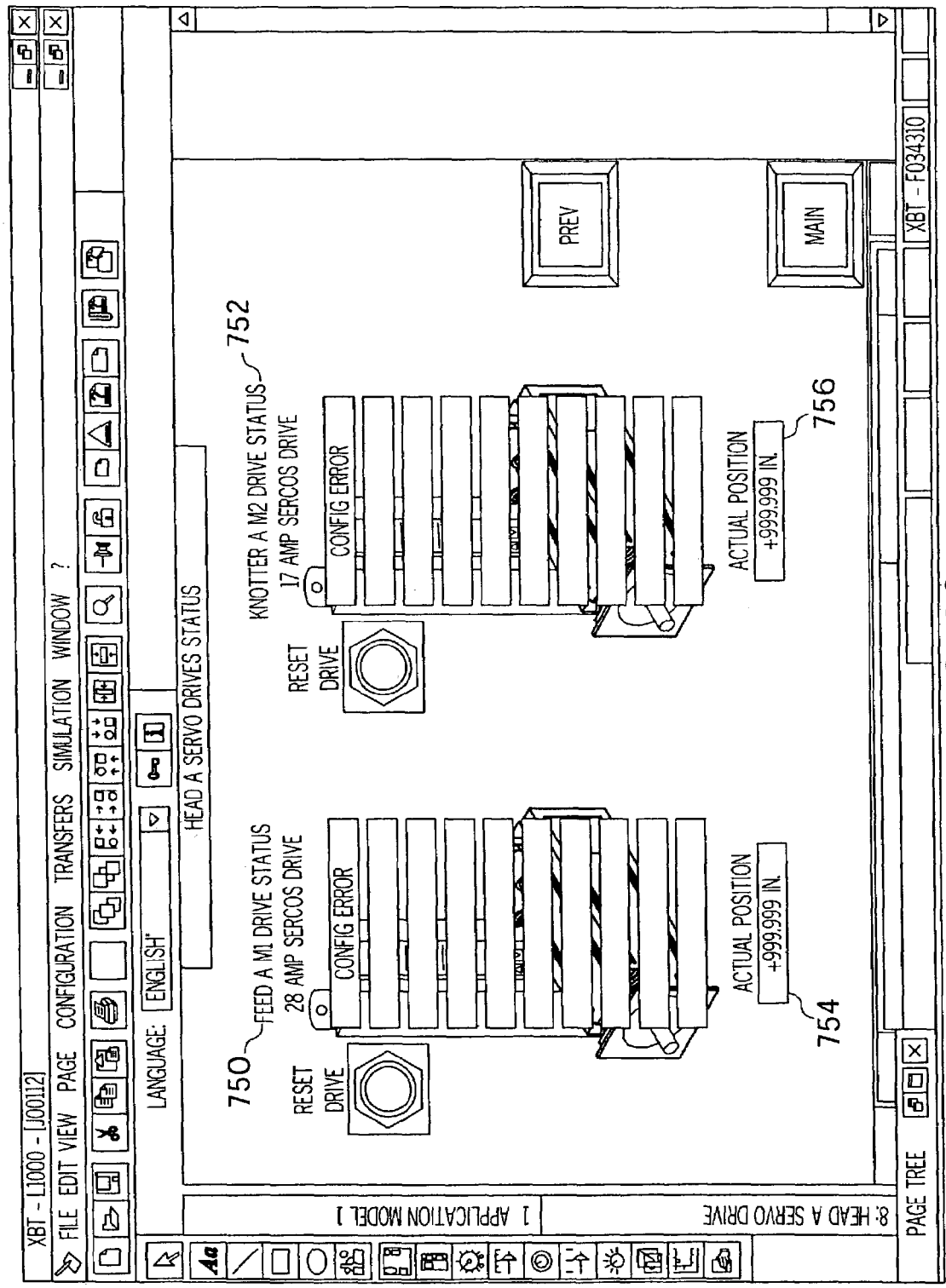
FIG. 6C is "head servo drives status" screen.
Figure 7A:
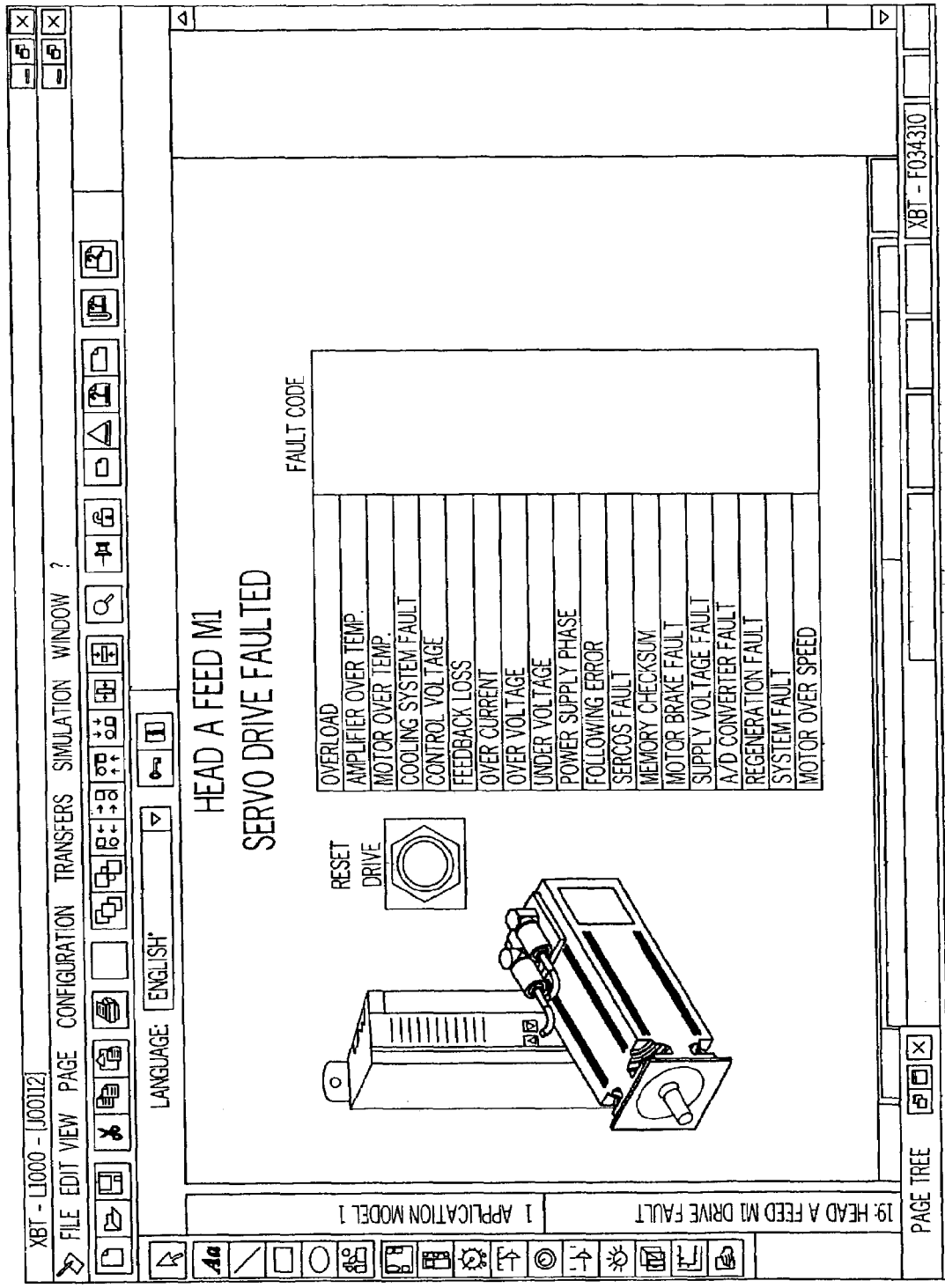
FIG. 7A is the "head feed servo drive faulted" screen.
Figure 7B:
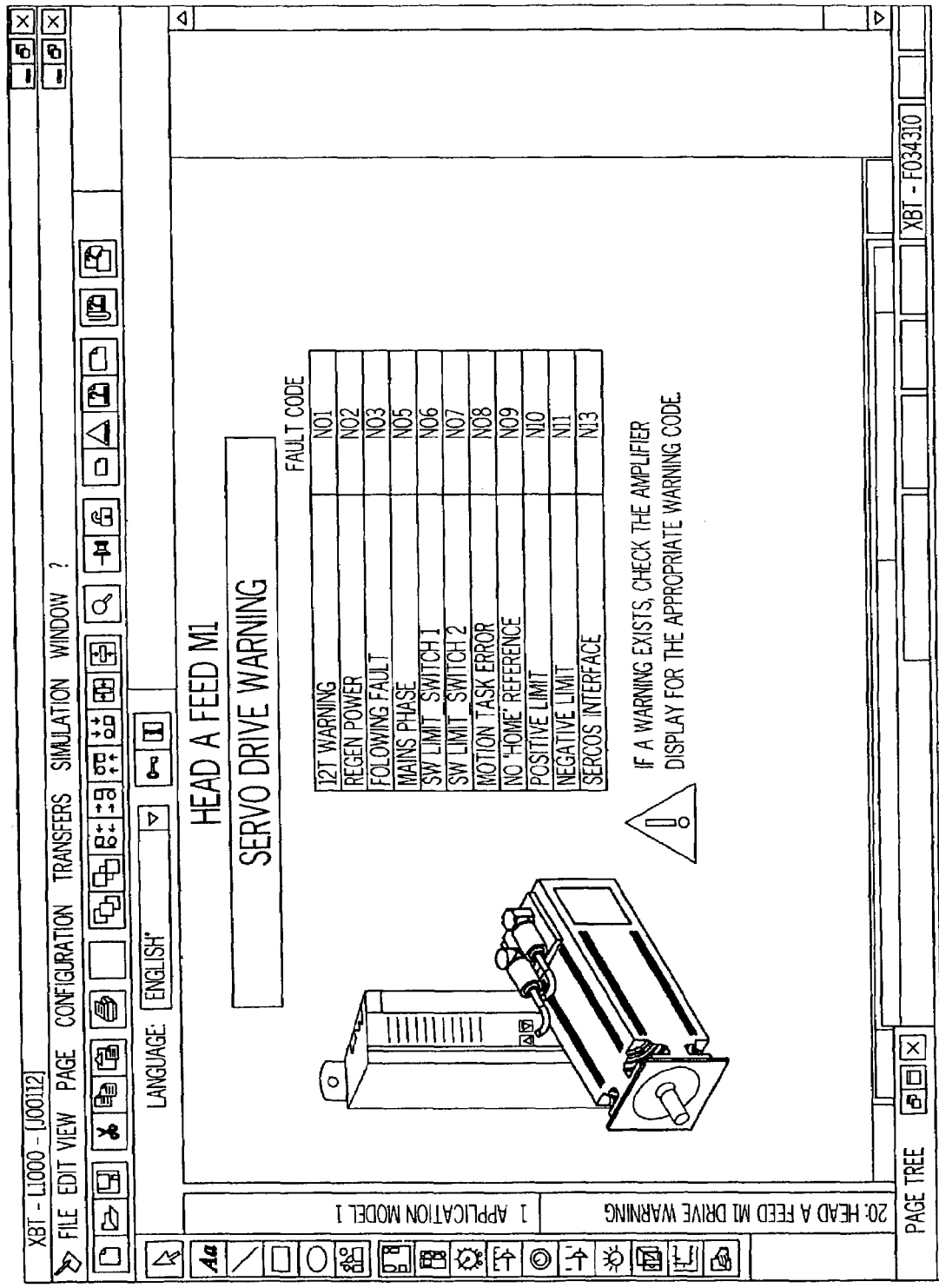
FIG. 7B is the "head feed servo drive warning" screen.
Figure 7C:
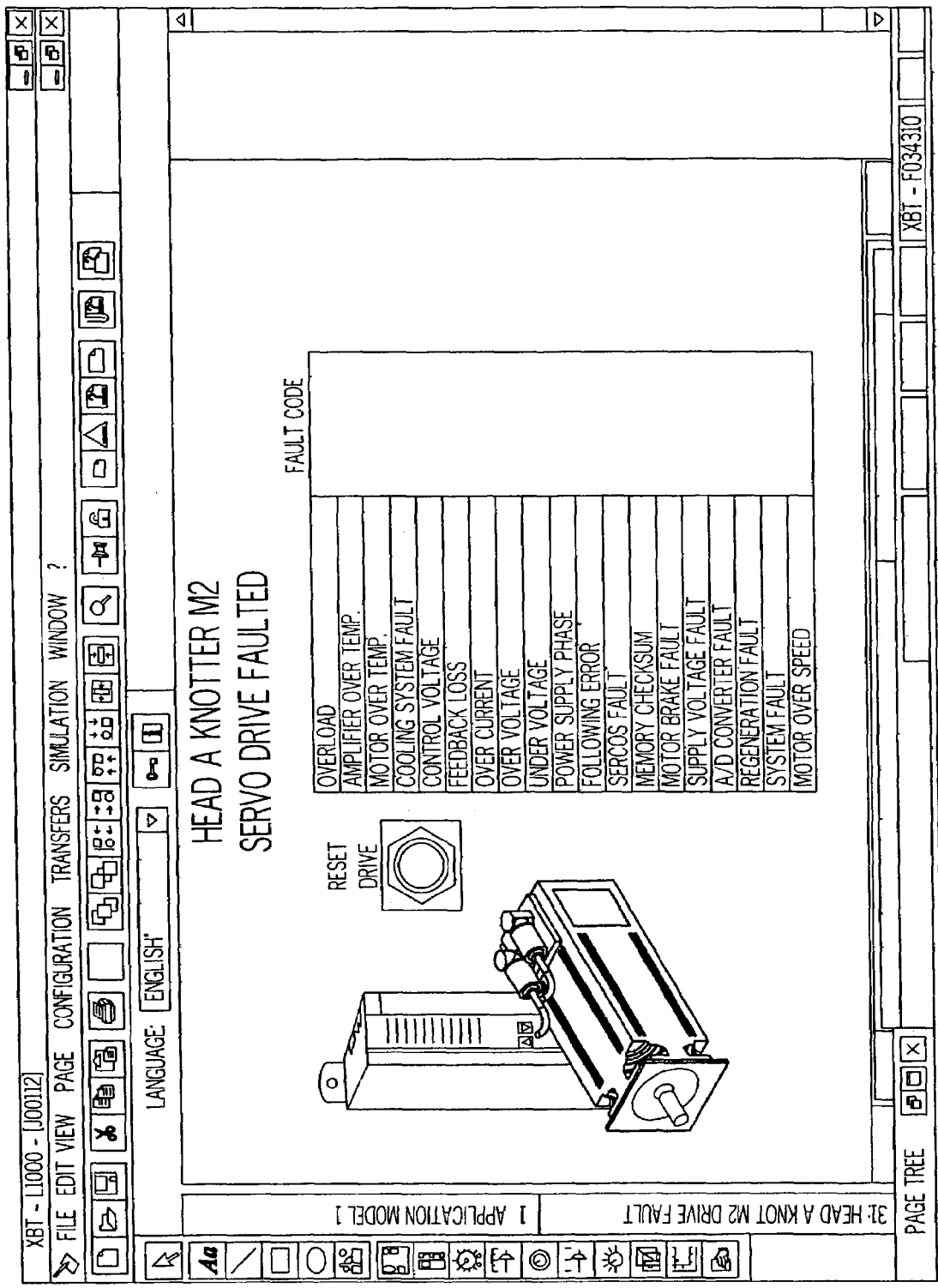
FIG. 7C is the "head knotter servo drive faulted" screen.
Figure 7D:
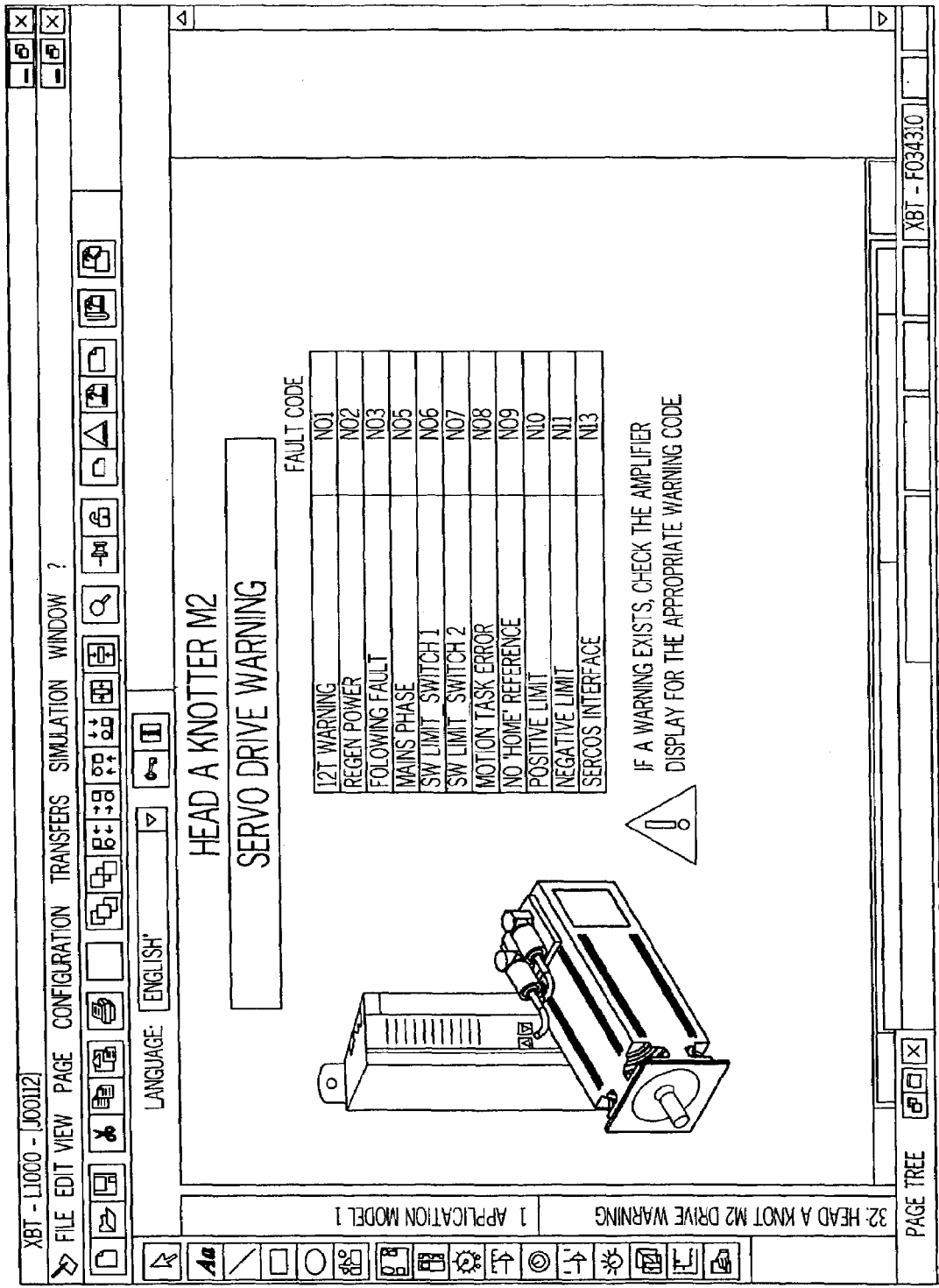
FIG. 7D is the "head knotter servo drive warning" screen.

FIG. 6C depicts the "Head A servo drive status" screen. In a manner similar to FIG. 3C, a known array of servo motor faults and warnings may be displayed in the "Feed A M1 drive status" column, 750, and in the "knotter A M2 drive status" column, 752. Again, actual position information for each servo is displayed on this screen at fields, 754 and 756. These fields link to screens with more detailed information.

Servo motor design and fault monitoring is a developed art. A number of known faults and warnings internal to the servo motors are known in the art. These are displayed for the benefit of user control at the screens depicted in FIGS. 7A, 7B, 7C and 7D.

Figure 8:
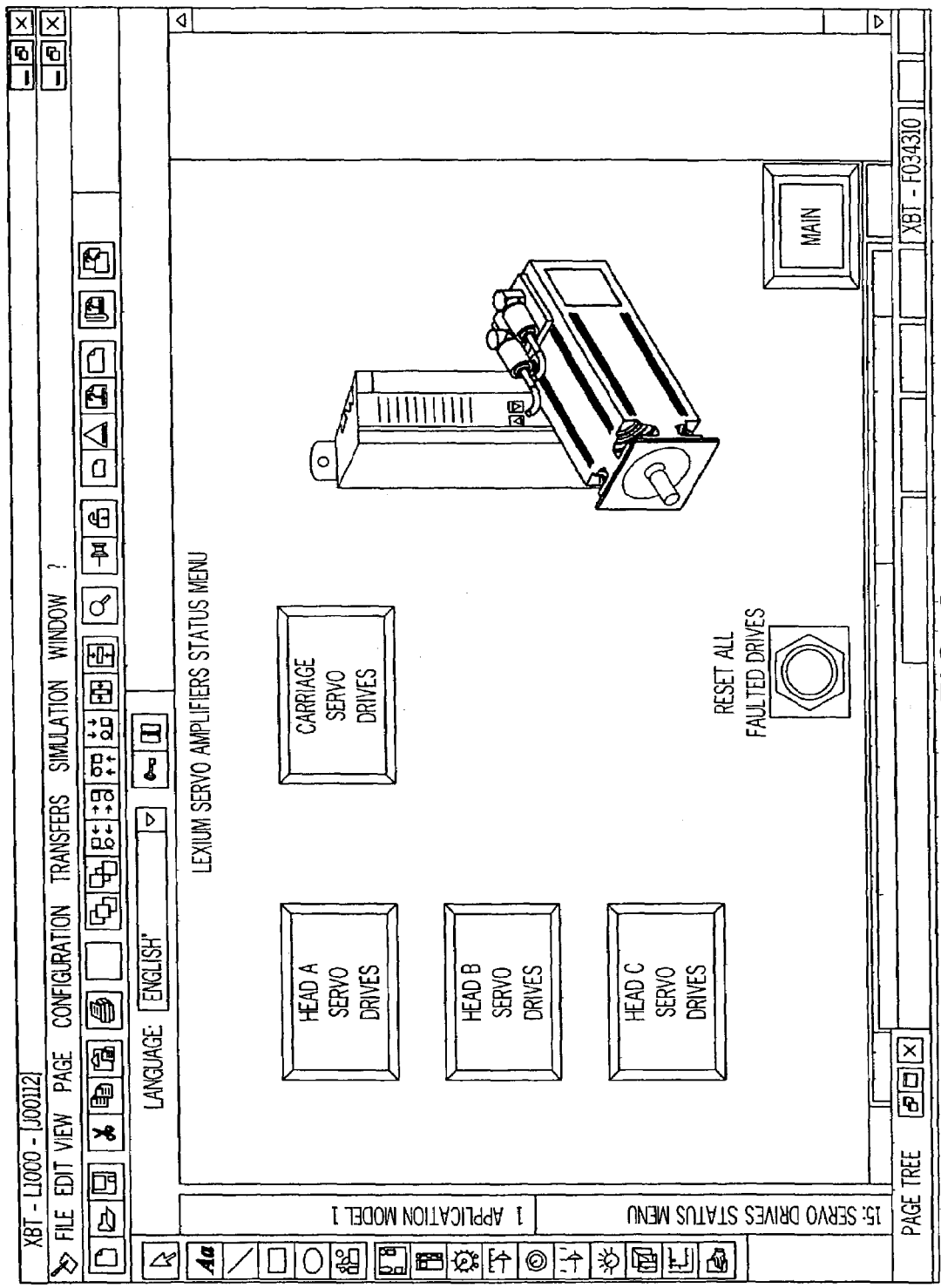
FIG. 8 is the "Lexium servo amplifiers status menu" screen.
Figure 9:
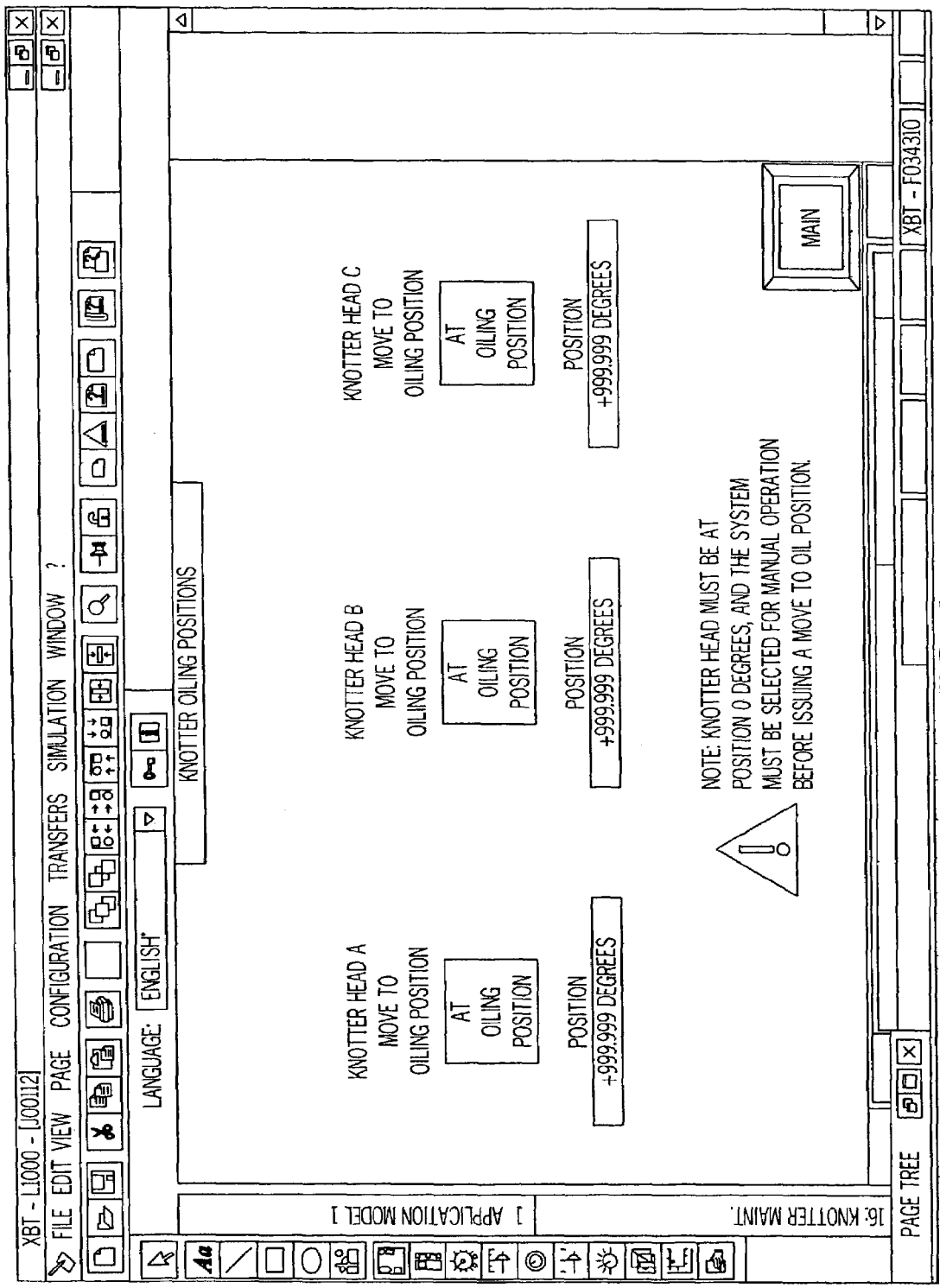
FIG. 9 is the "knotter oiling positions" screen.

The preferred embodiment of the present invention also allows for control and data feedback for peripheral aspects of the automatic baler. The fiber optic Lexium servo status is displayed at FIG. 8. Manual override for oiling maintenance is controllable at the screen displayed in FIG. 9.

The preferred embodiment of the present invention incorporates safety features. An alarm and/or arrest trigger is responsive to a malfunction such as a wire caught in the wire guide track. This trigger is actuated by the PLC of the present control system monitoring the torque of the drive electro-servo motor by means of monitoring current amperage levels and comparing them to a preconfigured safe maximum. Alternatively, the alarm is triggered by comparing torque levels to position information. That is, if the torque reaches the level expected at the end of the bale wire loop at a position before that expected terminus, the alarm and/or arrest is triggered.

Figure 10:
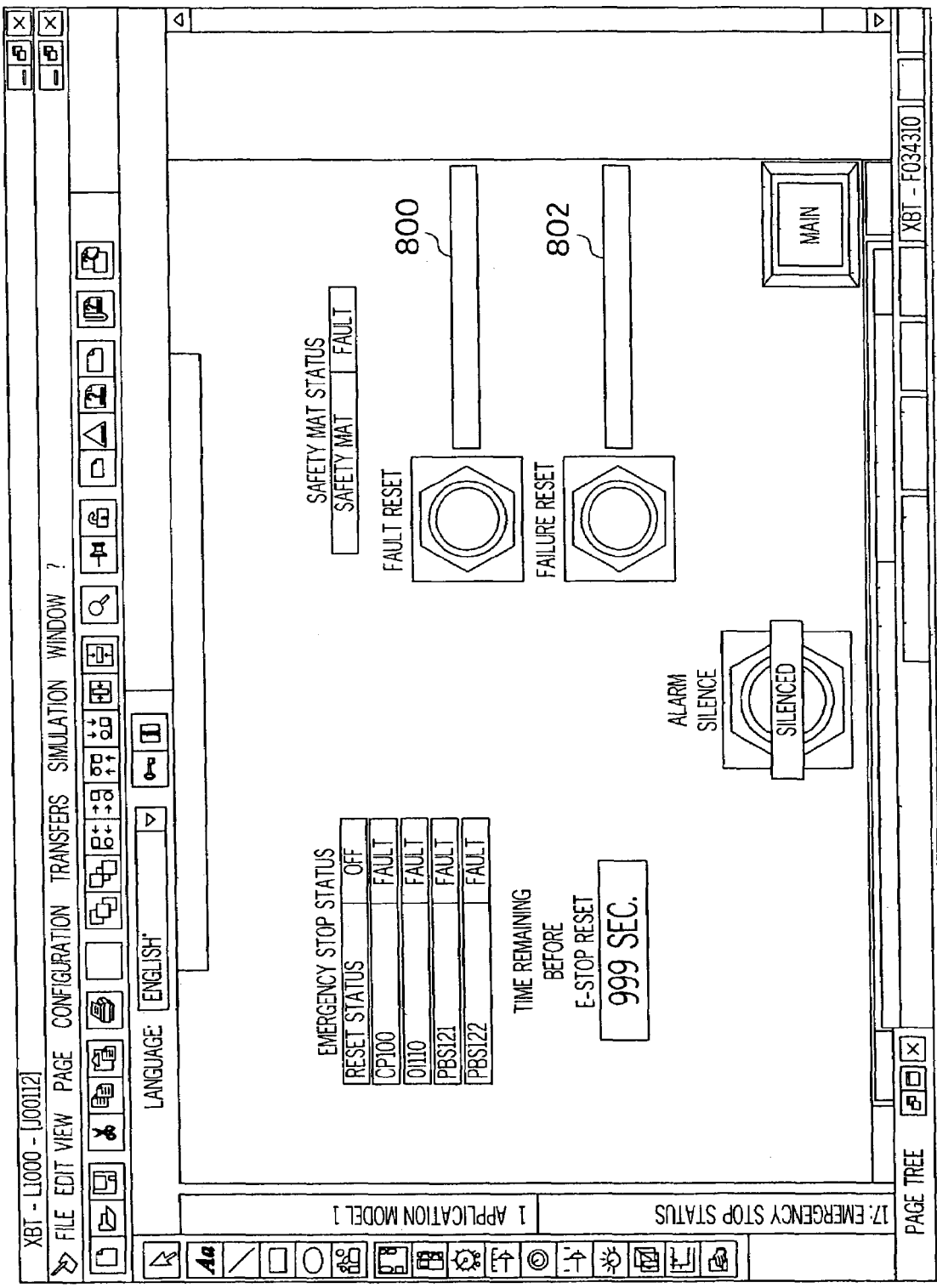
FIG. 10 is the "system emergency stop and safety mat status" screen.

Another safety feature is a safety mat, which is triggered when a worker steps into a dangerous position. Emergency stop capabilities of the safety mat are displayed at FIG. 10. "Fault reset" button, 800, allows the automatic process to be reinitiated after a worker has stepped on the mat and halted the process. If the mat itself if malfunctioning, the safety mat can be reset after repair with the "failure reset" button, 802.

Figure 11:
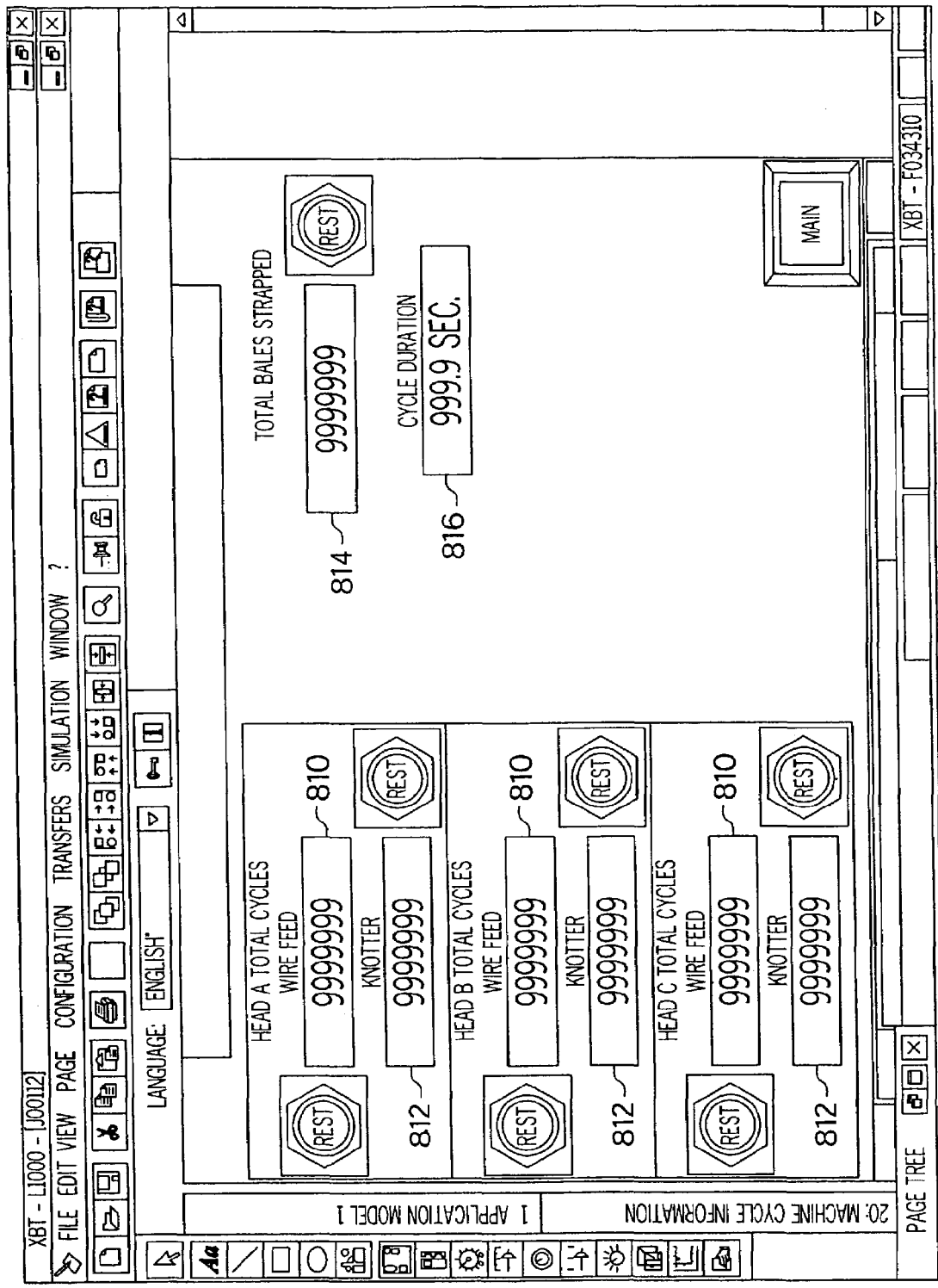
FIG. 11 is the "machine cycle information" screen.

FIG. 11 depicts the screen, "machine cycle information" which displays for each head, the total wire fed for the day at field, 810, and total number of knotter cycles at field 812. The total number of bales strapped in a session is displayed at field, 814, and the elapsed time for each cycle is displayed at field, 816.

Figure 12:
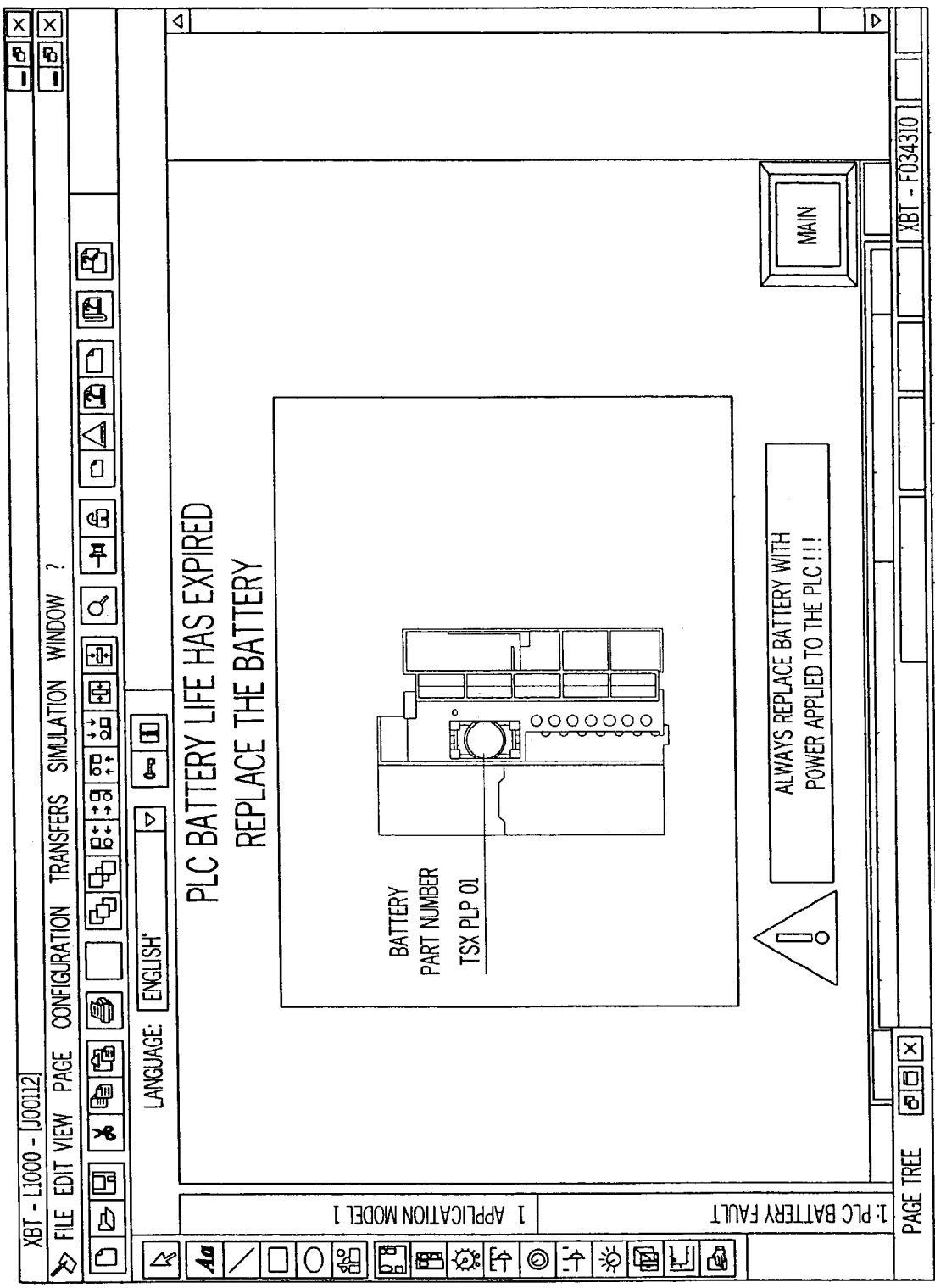
FIG. 12 is the "replace the battery" screen.

FIG. 12 monitors the charge on a battery that powers the PLC.

This disclosure is illustrative and not limiting and accordingly, the control system apparatus and processes described herein may be practiced through use of entirely physical relays and timers. Alternatively, a variety of CPUs such as typical laptop computers may be equivalently programmed for the operator interface of the present invention. The preferred embodiment, however, uses a programmable logic controller. Use of PLCs also incorporates actual physical relays, switches and sensors for input, and output signals to actual switches. However, internal relays may be used to encode and store data reflecting the status of the process steps. These are internal software processes executed through the use of bit locations in registers. Also, the control system of the present invention sequentially executes the process described herein. In order to effect this step-by-step process, delay instructions are often used. These two take advantage of the nature of the PLC software operation. PLC's work by continually scanning a program. In a broad sense, PLC operation sequentially scans input status, executes programs and updates output status, then repeats. It is a complex series of "if X, then Y" commands, executed in cycles of 100's of milliseconds. The preferred embodiment of the present invention includes a program for control of a bulk material baler sequentially executing process steps according to the operator input process parameters described herein.

In the preferred embodiment of the present invention all PLC to apparatus signals are communicated by means of a fiber optic link such as a Sercos circuit manufactured by "Telemakanique Alexian." Use of fiber optic linking in the preferred embodiment of the present invention saves space in the apparatus as the fiber optic linking cables and apparatuses occupy a smaller volume than traditional electrical cables. Moreover, use of the fiber optic link in the preferred embodiment of the present invention eliminates sensitivity to power surges and electrical interference which cause inefficiencies in prior art applications and alternative embodiments.

Alternative embodiments of the present invention would similarly control torque, speed, position and other process variables in automatic baling machines using a hydraulic, pneumatic or other drive systems, either through monitoring and comparing with a pre-configured memory, pressure values or other values.

The term "strap" is a recognized industry term of art understood by those of skill in the art to mean generically wire, metal bands, plastic bands or other types of straps. A "strap fastener" is therefor recognized to mean a wire knotter, a band welder, a band crimper, or any other device for attaching one end of the strap around a bale to the other end. Typically, strap fasteners require some overlap of the portion of the strap near each end, so that there are working portions of the ends of strapping to knot, in the case of wire, or crimp, in the case of banding. The preferred embodiment of the present invention uses "straps" that are wire, most preferedly 10-guage wire. Those of skill in the art will understand from the use of the term "strap" that the scope of the present invention applies equivalently to both wire, metal bands, plastic bands and any other kind of binding strap used in bulk material baling.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An operator interface for a bulk material baler and baler control system comprising:
   a display having a plurality of process parameter input fields;
   an operator interface to receive operator input process parameters, said operator interface being in operative communication with said display;
   a memory for storing said operator input process parameters, said memory being in communication with said operator interface;

a process control data structure responsive to said operator input process parameters stored in said memory, said process control data structure being adapted for operational communication with the bulk material baler; and said process parameters comprising tying cylinder parameters and at least one carriage control parameter;

whereby said process parameters are input into said memory by the operator using said operator interface and said process control data structure controls said bulk material baler according to said memory of said process parameters.

2. The operator interface for a bulk material baler of claim 1, wherein said tying cylinder parameters include tying cylinder position.

3. The operator interface for a bulk material baler of claim 1, wherein said tying cylinder parameters include tying cylinder speed.

4. The operator interface for a bulk material baler of claim 3 wherein said tying cylinder speed parameters include a fast speed and a slow speed.

5. The operator interface for a bulk material baler of claim 4 wherein said tying cylinder speed parameters include a position for deceleration from said fast speed to a terminal slow speed.

6. The operator interface for a bulk material baler of claim 4 wherein said tying cylinder speed parameters include a position for acceleration from an initial slow speed to said fast speed.

7. The operator interface for a bulk material baler of claim 4 wherein said tying cylinder speed parameters include a deceleration rate from said fast speed to a terminal slow speed.

8. The operator interface for a bulk material baler of claim 4 wherein said tying cylinder speed parameters include an acceleration rate from an initial slow speed to said fast speed.

9. The operator interface for a bulk material baler of claim 1, wherein said tying cylinder parameters include tying cylinder torque.

10. The operator interface for a bulk material baler of claim 1 wherein said tying cylinder parameters include a stop position.

11. The operator interface for a bulk material baler of claim 1, wherein said process parameters comprise strap feed parameters.

12. The operator interface for a bulk material baler of claim 11, wherein said strap feed parameters include strap feed speed.

13. The operator interface for a bulk material baler of claim 12 wherein said strap feed speed parameters include a fast speed and a slow speed.

14. The operator interface for a bulk material baler of claim 13 wherein said strap feed speed parameters include a position for deceleration from said fast speed to a terminal slow speed.

15. The operator interface for a bulk material baler of claim 13 wherein said strap feed speed parameters include a position for acceleration from an initial slow speed to said fast speed.

16. The operator interface for a bulk material baler of claim 13 wherein said strap feed speed parameters include a deceleration rate from an initial said fast speed to terminal slow speed.

17. The operator interface for a bulk material baler of claim 13 wherein said strap feed speed parameters include an acceleration rate from an initial slow speed to said fast speed.

18. The operator interface for a bulk material baler of claim 11, wherein said strap feed parameters include strap feed torque.

19. The operator interface for a bulk material baler of claim 11, wherein said strap feed parameters include strap feed position.

20. The operator interface for a bulk material baler of claim 11, wherein said strap feed parameters include strap release tension.

21. The operator interface for a bulk material baler of claim 1, further comprising;
a plurality of data sensors;
a plurality of data sensor feedback systems receiving data from said data sensors, said data sensor feedback systems further comprising;
a data sensor memory in communication with said data sensors;
a data sensor communication with said process control data structure;
a sensor data display in communication with said data sensors; and
said data sensor feedback systems being configured to process data comprising tying cylinder parameters.

22. The operator interface for a bulk material baler of claim 21 wherein said tying cylinder parameters are selected from the group consisting of; tying cylinder position, tying cylinder stop position, tying cylinder torque, tying cylinder speed, tying cylinder acceleration, and tying cylinder deceleration.

23. The operator interface of claim 21 wherein said data sensor memory is in operative communication with said display.

24. The operator interface of claim 21 wherein said data sensor memory retains a history of said sensor data beyond one baling cycle.

25. The operator interface for a bulk material baler of claim 1, further comprising;
a plurality of data sensors;
a plurality of data sensor feedback systems receiving data from said data sensors, said data sensor feedback systems further comprising;
a data sensor memory in communication with said data sensors;
a data sensor communication with said process control data structure;
a sensor data display in communication with said data sensors; and,
said data sensor feedback systems being configured to process data comprising strap feed parameters.

26. The operator interface for a bulk material baler of claim 25 wherein said strap feed parameters are selected from the group consisting of; strap feed position, strap feed stop position, strap feed speed, strap feed torque, strap release tension, strap feed acceleration and strap feed deceleration.

27. The operator interface of claim 25 wherein said data sensor memory is in operative communication with said display.

28. The operator interface of claim 25 wherein said data sensor memory retains a history of said sensor data beyond one baling cycle.

29. The operator interface for a bulk material baler of claim 9 wherein said carriage control parameter further comprise carriage speed control parameters.

30. The operator interface for a bulk material baler of claim 29 wherein said carriage speed control parameters include a fast speed and a slow speed.

31. The operator interface for a bulk material baler of claim 30 wherein said carriage speed control parameters include a deceleration rate from said fast speed to a terminal slow speed.

32. The operator interface for a bulk material baler of claim 30 wherein said carriage speed control parameters include an acceleration rate from an initial slow speed to said fast speed.

33. The operator interface for a bulk material baler of claim 9 wherein said carriage control parameters include position parameters selected from the group consisting of; carriage position; deceleration position; acceleration position and stop position.

34. The operator interface of claim 1 wherein said operator interface receiving operator input process parameters is a touch screen.

35. The operator interface of claim 1 wherein said operator interface receiving said operator input process parameters is a keyboard.

\* \* \* \* \*